(12) United States Patent
Poutiatine

(10) Patent No.: US 10,139,273 B2
(45) Date of Patent: Nov. 27, 2018

(54) METHOD AND SYSTEM FOR MEASURING LOCAL ULTRAVIOLET EXPOSURE

(71) Applicant: Andrew Poutiatine, Mill Valley, CA (US)

(72) Inventor: Andrew Poutiatine, Mill Valley, CA (US)

(73) Assignee: Andrew Poutiatine, Mill Valley, CA (US)

( * ) Notice: Subject to any disclaimer, the term of this patent is extended or adjusted under 35 U.S.C. 154(b) by 0 days.

(21) Appl. No.: 15/648,158

(22) Filed: Jul. 12, 2017

(65) Prior Publication Data

US 2018/0017437 A1 Jan. 18, 2018

Related U.S. Application Data

(60) Provisional application No. 62/361,414, filed on Jul. 12, 2016, provisional application No. 62/380,455, filed on Aug. 28, 2016, provisional application No. 62/434,184, filed on Dec. 14, 2016, provisional application No. 62/404,131, filed on Jul. 12, 2016.

(51) Int. Cl.
*G01J 1/42* (2006.01)

(52) U.S. Cl.
CPC ............. *G01J 1/429* (2013.01); *G01J 1/4204* (2013.01); *G01J 2001/4266* (2013.01)

(58) Field of Classification Search
CPC .... G01J 1/58; G01J 1/4204; G01J 2001/4266; G01J 1/429; G01N 21/33
See application file for complete search history.

(56) References Cited

U.S. PATENT DOCUMENTS

| | | | |
|---|---|---|---|
| 5,008,548 A | 4/1991 | Gat | |
| 2011/0222375 A1* | 9/2011 | Tsubata | G01J 1/02 368/11 |

(Continued)

OTHER PUBLICATIONS

Brian Diffey, Sources and measurement of ultraviolet radiation, Jun. 19, 2002, Elseiver Science, pp. 4-12.*

(Continued)

*Primary Examiner* — Michael P Lapage
(74) *Attorney, Agent, or Firm* — Run8 Patent Group, LLC; Peter Miller

(57) ABSTRACT

One variation of a method for measuring ambient ultraviolet light radiation including: calculating a target direct orientation of a light exposure device based on a location, a current date and time, and a direct solar position model; calculating a target diffuse orientation of the light exposure device based on the location, the current date and time, and a diffuse solar position model; in response to detecting alignment between orientation of the light exposure device and the target direct orientation, recording a direct ultraviolet value; in response to detecting alignment between orientation of the light exposure device and the target diffuse orientation, recording a diffuse ultraviolet value; in response to detecting alignment between orientation of the light exposure device and a target global orientation, recording a global ultraviolet value; and calculating an ultraviolet index based on the global ultraviolet value, the direct ultraviolet value, and the diffuse ultraviolet value.

14 Claims, 6 Drawing Sheets

(56) References Cited

U.S. PATENT DOCUMENTS

| | | | |
|---|---|---|---|
| 2011/0273704 A1* | 11/2011 | Burba | G01J 1/04 |
| | | | 356/222 |
| 2013/0314699 A1* | 11/2013 | Jungerman | G01J 1/0266 |
| | | | 356/139.01 |
| 2015/0102208 A1 | 4/2015 | Appelboom et al. | |
| 2015/0177056 A1 | 6/2015 | Lian et al. | |
| 2016/0041035 A1 | 2/2016 | Allen et al. | |
| 2016/0237745 A1* | 8/2016 | Wen | E06B 9/24 |
| 2017/0191866 A1* | 7/2017 | Balooch | G01J 1/429 |

OTHER PUBLICATIONS

Diffey. "Sources and measurement of ultraviolet radiation." In. Methods. Jun. 19, 2002 (Jun. 19, 2002) Retrieved from < http:// http://users.ntua.gr/mmakro/uvsource-measurem.pdf > entire document.

* cited by examiner

METHOD AND SYSTEM FOR MEASURING LOCAL ULTRAVIOLET EXPOSURE

CROSS-REFERENCE TO RELATED APPLICATIONS

This Application claims the benefit of U.S. Provisional Application No. 62/361,414, filed on 12 Jul. 2016 and U.S. Provisional Application No. 62/380,455, filed on 28 Aug. 2016, both of which are incorporated in their entireties by this reference.

TECHNICAL FIELD

This invention relates generally to the field of measuring ultraviolet light radiation and more specifically to a new and useful method for locally measuring ultraviolet radiation through an ultraviolet radiation measurement device.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

As shown in FIGS. 1-5, a method S100 includes accessing a location of a light exposure device including an ultraviolet sensor in Blocks S112 and S114; calculating a target direct orientation of the light exposure device based on the first location, a current date and time, and a direct solar position model, the ultraviolet sensor approximately normal the Sun when the light exposure device occupies the target direct orientation at approximately the current time in Block S122; calculating a target diffuse orientation of the light exposure device based on the first location, the current time, and a diffuse solar position model, the ultraviolet sensor biased away from the Sun and above the horizon when the light exposure device occupies the target diffuse orientation at approximately the current time in Block S124; tracking an orientation of the light exposure device in Block S130; in response to detecting alignment between orientation of the light exposure device and the target direct orientation at approximately the current time, recording a direct ultraviolet value read from the ultraviolet sensor in Block S142; in response to detecting alignment between orientation of the light exposure device and the target diffuse orientation at approximately the current time, recording a diffuse ultraviolet value read from the ultraviolet sensor in Block S144; in response to detecting alignment between orientation of the light exposure device and a target global orientation at approximately the current time, recording a global ultraviolet value read from the ultraviolet sensor in Block S146; and calculating a current ultraviolet index at the light exposure device based on the global ultraviolet value in Block S150.

Figure 1A:
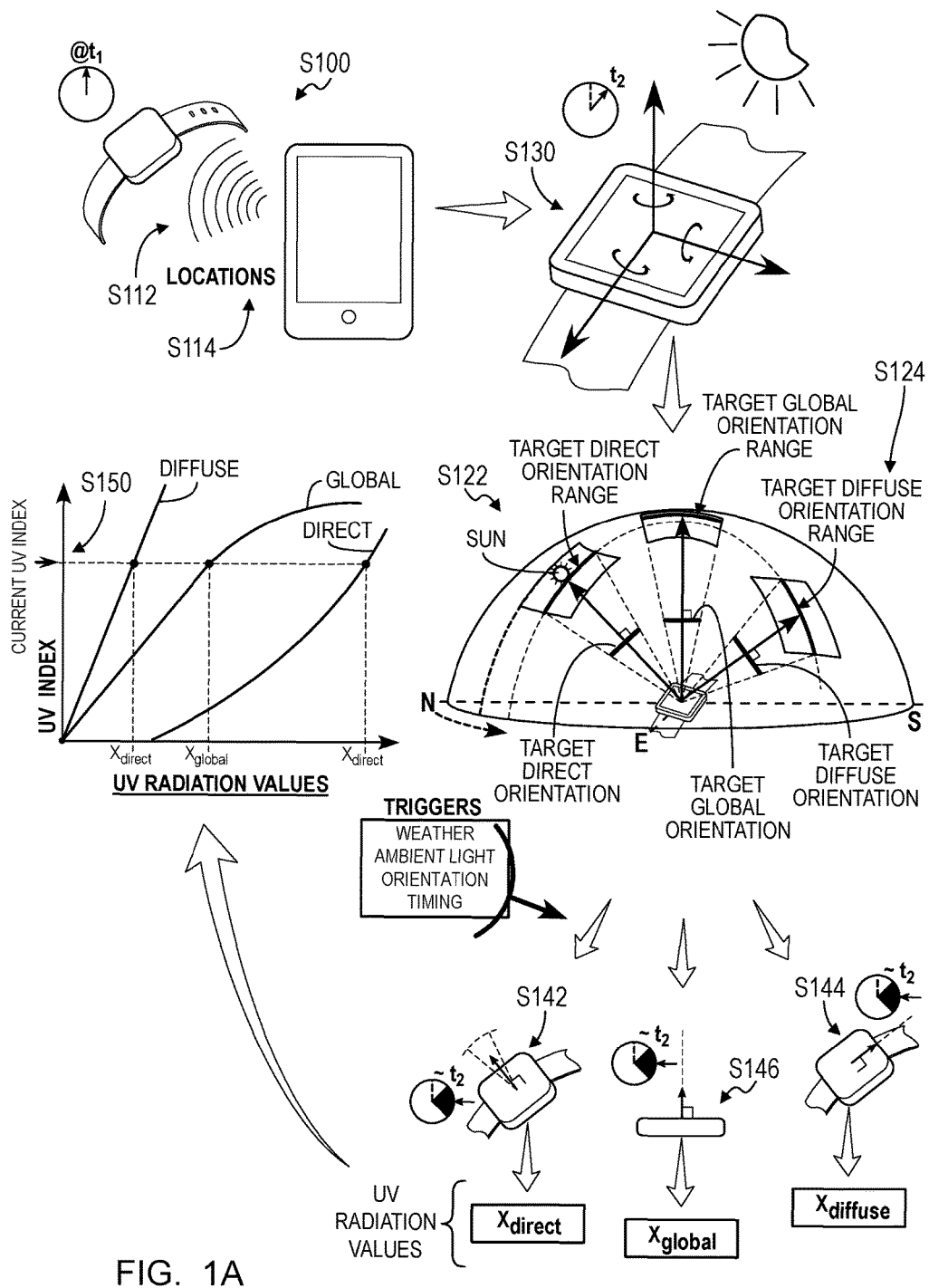
FIGS. 1A and 1B are flowchart representations of a first method.
Figure 1B:
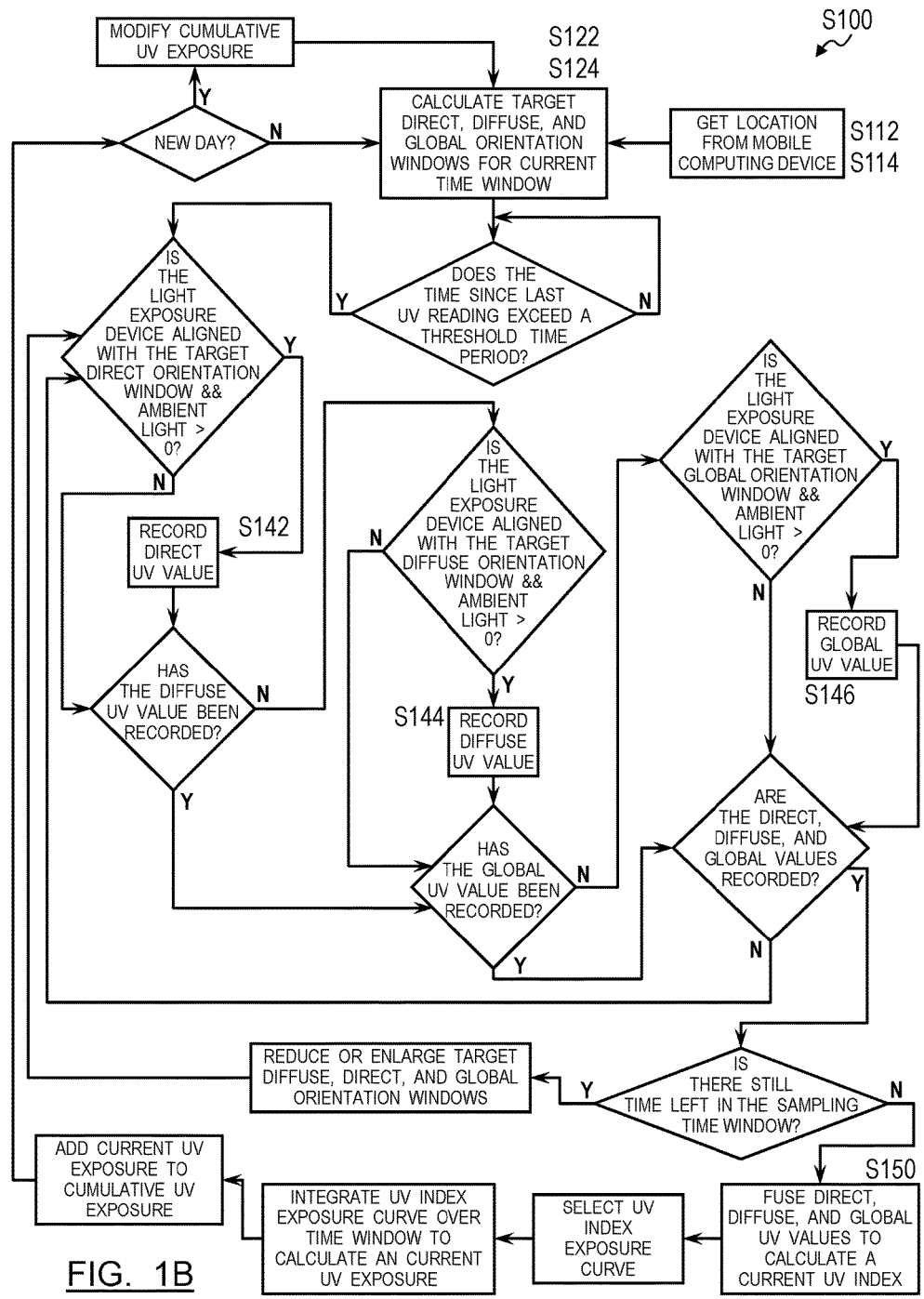

One variation of the method S100 shown in FIG. 1B includes: accessing a first location of a light exposure device including an ultraviolet sensor; tracking an orientation of the light exposure device; in response to detecting alignment between orientation of the light exposure device and a target global orientation window at a first time, recording a first value read from the ultraviolet sensor as a global ultraviolet value; and calculating a first ultraviolet index at the light exposure device corresponding to the first time based on the global ultraviolet value.

2. Applications

Generally, the method S100 can be executed by a light exposure device and a software program executing on a mobile computing device to accurately monitor a user's ultraviolet exposure over time by: defining a target orientation of the light exposure device in real space that locates an ultraviolet sensor in the light exposure device at a known angular offset from the Sun based on an approximate geo-location of the light exposure device and a current date and time; opportunistically recording ultraviolet values through the ultraviolet sensor when the light exposure device is aligned to this target orientation during a sampling interval; matching these ultraviolet values to one of a set of pre-defined ultraviolet exposure models for this sampling interval; integrating the ultraviolet exposure model over the duration of the sampling interval to accurately estimate the user's ultraviolet exposure during this sampling interval; and repeating this process over time (e.g., over the course of one day) and summing ultraviolet exposures during each sampling interval over this period of time to calculate the user's total ultraviolet exposure during this period of time period of time while also achieving a minimal sampling rate, reducing power consumption, and extending battery life of the light exposure device during this period of time. In particular, during a sampling interval, the light exposure device can: record multiple ultraviolet values at discrete orientations of the light exposure device relative to the Sun and/or relative to the Earth; process (e.g., "fuse") these ultraviolet values and orientations of the light exposure device at times that these ultraviolet values were recorded into an estimate of a current ultraviolet index at this time; and predict ultraviolet indices local to the user will be exposed over a subsequent duration of time (e.g., fifteen minutes) by selecting a particular predefined ultraviolet index model (e.g., a "UV curve")—from a set of predefined ultraviolet index models—that best aligned to the current ultraviolet index estimate. Therefore, the light exposure device can opportunistically record a limited number of ultraviolet values over an extended duration of time (e.g., fifteen minutes) to accurately estimate an ultraviolet index to which a user is exposed during this duration of time. The light exposure device (or a native application or other software program executing on an affiliated mobile computing device) can then integrate these estimated ultraviolet indices—including values generated directly from ultraviolet values read from the ultraviolet sensor in the light exposure device and estimated from predefined ultraviolet index models—over time to accurately estimate the user's total ultraviolet exposure.

Thus, the method S100 can be implemented to both track and anticipate an ultraviolet exposure for a user proximal the light exposure device over an exposure period. Based on the ultraviolet exposure, the light exposure device can recommend behavioral modifications to protect a user associated with (e.g., wearing) the light exposure device from sun damage. For example, the light exposure device and/or the software program can prompt a user to reapply sunscreen or move to a shaded area out of direct Sunlight. Thus, the method S100 can function: to opportunistically collect ultraviolet exposure data, thereby reducing or eliminating a need for a user to perform manual readings; to intermittently record data through sensors in the device and to project ultraviolet exposure over extended durations of time based on these intermittent data, thereby extending battery life of the light exposure device; and to accurately estimate the user's exposure to ultraviolet radiation over time based on these data such that prompts to increase sun exposure, decrease sun exposure, or apply sunscreen, etc. served to the user according to these ultraviolet exposure data are accurate and relevant to the user.

In one application shown in FIG. 1A, Blocks of the method S100 can be implemented by a light exposure device, such as a wearable device or other portable device with an integrated ultraviolet sensor that a user may carry. For example, the light exposure device can be a smartphone; a GPS-enabled smartwatch; an ultraviolet-sensitive band configured to be worn on a user's wrist; a ring worn on a finger; a pin, button, brooch configured to be clipped or attached to an item of clothing or to a bag; a drink cooler; a beach umbrella; a ski pole; a golf bag; and/or any other portable or mobile device that a user may carry in order to track the user's corporeal ultraviolet exposure over a period of time (e.g., per day). The light exposure device can also be linked to and can cooperate with a mobile computing device (e.g., a mobile phone, a tablet, a smartwatch, etc.) to implement Blocks of the method S100.

Thus, the method S100 can be implemented by a light exposure device and/or a mobile computing device to track ultraviolet exposure (e.g., UVB radiation exclusively or UVA, UVB, and UVC) and recommend behavior modifications to limit erythemal impact, skin damage, etc. to a user wearing or otherwise interfacing with the light exposure device.

2.1 Applications: Accuracy

Based on the location of the mobile computing device and a current date and time, the light exposure device can implement Blocks of the method S100 to estimate a solar position of the Sun relative the light exposure device based on a local copy of a derived solar position model stored on the light exposure device. From this solar position, the light exposure device can calculate target orientations of the light exposure device relative to the Earth to record a limited number of ultraviolet values from which the light exposure device can accurately estimate the current ultraviolet index proximal the user. In particular, the method S100 can be implemented by the light exposure device: to calculate a solar position of the Sun in relation to a location near the light exposure device; based on the solar position, to define target orientations for recording ultraviolet values with the light exposure device when an ultraviolet sensor in the light exposure device is aligned with the Sun (i.e., a target "direct" orientation), at an angle offset and biased from the Sun toward open sky (i.e., a target "diffuse" orientation), and/or normal to the Earth's surface (i.e., a target "global" orientation directed toward the user's zenith); to arm a controller integrated into the light exposure device to record ultraviolet values through the ultraviolet sensor; and to record ultraviolet values through the ultraviolet sensor in response to non-specific motion of the light exposure device resulting in alignment of the light exposure device to these target orientations, such as within a preset tolerance or orientation window.

By consistently recording multiple redundant ultraviolet values according to a predefined orientation schedule (e.g., direct and diffuse orientations relative to the Sun and a global orientation relative to Earth) per sampling interval, the light exposure device can: calculate a single ultraviolet index based on the global ultraviolet value; and/or fuse multiple ultraviolet values (e.g., the direct and diffuse ultraviolet values) read when the light exposure device occupied these target orientations during a sampling interval into a single ultraviolet index value that represents a relatively accurate measure of the user's ultraviolet irradiance during this sampling interval. Furthermore, by narrowing the target orientation range for recording ultraviolet values in the global, direct, and/or diffuse orientations as opportunistic ultraviolet values are recorded during the sampling interval, the method S100 can collect more accurate ultraviolet values and reduce error in an ultraviolet index derived from these ultraviolet values.

The method S100 can also be implemented to calculate an "instant" ultraviolet index at the light exposure device and to track ultraviolet exposure immediately surrounding the light exposure device—as opposed to approximating a local ultraviolet index based on an ultraviolet radiation reading recorded remotely from the light exposure device (e.g., at a weather station)—as the light exposure device traverses a trajectory intersecting current target direct, diffuse, and global orientation windows over a period of time. In particular, the method S100 can be implemented to accurately track ultraviolet exposure along a trajectory traversed by the light exposure device over a sampling interval by intermittently recording ultraviolet values detected by the ultraviolet sensor integrated into the light exposure device. Thus, the light exposure device can implement Blocks of the method S100 to improve accuracy of real-time location-based ultraviolet radiation measurements.

For example, a mobile computing device linked to the light exposure device can determine that it is located in San Francisco, Calif., which encompasses a multitude of varying microclimates within forty-nine square miles. When the light exposure device wirelessly connects to the mobile computing device over short-range wireless communication protocol, over a local wireless network, or over a wired connection, the mobile computing device can upload its location to the light exposure device. In this example, a user wearing the light exposure device may travel from the Marina neighborhood of San Francisco to the South of Market (i.e., "SoMa") neighborhood and then to the Potrero Hill neighborhood on a particular day. A global ultraviolet value can be recorded by a single static weather station in the North Beach neighborhood, and an approximate ultraviolet index for San Francisco at this time can be calculated based on this single ultraviolet value. However, on this day, weather in the North Beach neighborhood may be cool and foggy while weather in the Marina neighborhood may be warmer and slightly overcast, weather in the "SoMa" neighborhood may be windy and clear, and weather in the Potrero Hill area may be warm and sunny. While the ultraviolet index calculated based on the single ultraviolet value recorded by the weather station may be approximately correct for the North Beach neighborhood, this ultraviolet index may be highly inaccurate (e.g., under-representative) for these other neighborhoods of San Francisco.

However, in this example, the light exposure device can implement Blocks of the method S100 to track and record instant ultraviolet values coincident with the light exposure device and the user wearing the light exposure device throughout this day. In particular, an ultraviolet sensor integrated into the light exposure device can record ultraviolet values intermittently throughout this day; and the light exposure device can manipulate these data to track the user's cumulative ultraviolet exposure throughout this day and as conditions change.

Therefore, the light exposure device can implement Blocks of method S100 to account for local variations in ultraviolet radiation indices—such as when the light exposure device is located in a shaded area, indoors, or under local cloud cover—in calculating cumulative ultraviolet exposure over a sampling interval. For example, outdoors (e.g., on a roof of a building) at a particular geolocation, the light exposure device can record ultraviolet values and, from the ultraviolet values, calculate an ultraviolet index of 6.0 for the particular geolocation. However, indoors (e.g., inside the building) at the particular geolocation, the light exposure device can record lower ultraviolet values and, from the ultraviolet values (e.g., the global ultraviolet value), calculate an ultraviolet index of 0.1 for the particular geolocation.

In order to track ultraviolet exposure as the light exposure device moves along a trajectory, the mobile computing device can intermittently (e.g., every hour, day, or week) transmit location information to the light exposure device when the light exposure device and the mobile computing device remain within a threshold area rather than continuously monitoring a path of the light exposure device and the mobile computing device. The light exposure device can implement a geolocation (e.g., a GPS location) received from the mobile computing device to calculate an approximate solar position (i.e., a position of the Sun) relative to the light exposure device and to calculate target orientations of the light exposure device at which the light exposure device is to record ultraviolet values that are then fused to calculate an accurate estimate of the ultraviolet index local to the light exposure device. In particular, the light exposure device can pass the approximate location of the light exposure device, the current date, and the current time into direct, diffuse, and global solar position models to calculate these target orientations, which may be accurate to within a threshold tolerance tighter than an accuracy of orientation or position sensors in the light exposure device.

The light exposure device can, thus, implement a singular geolocation over a geographic area (e.g., a 10 mile radius) in which the mobile computing device is located to calculate the target direct, diffuse, and global orientations, thereby leveraging accuracy of the solar position models and compensating for relative inaccuracy of the orientation and/or position sensor in the light exposure device. Furthermore, the mobile computing device can send a geolocation update to the light exposure device (exclusively) when the mobile computing device moves outside of this geographic area and the light exposure device is nearby (e.g., within wireless range of the mobile computing device).

Thus, the light exposure device can implement Blocks of the method S100 in real-time to accurately and promptly alert a user of her current ultraviolet exposure and/or risk of sunburn. By recording high quality ultraviolet values, the light exposure device can accurately calculate ultraviolet exposure to prevent transmission of asynchronous and irrelevant notifications to a user. For example, on a sunny day, a user may experience ultraviolet exposure so great that the user's skin may burn within minutes (e.g. five minutes) of moving outdoors. Thus, the light exposure device (and/or the mobile computing device) can transmit a timely notification to the user to move indoors, apply sunscreen, and/or otherwise avoid continued ultraviolet exposure. However, if the light exposure device were to calculate the current ultraviolet index and/or project ultraviolet exposure inaccurately, the light exposure device can alert the user of excessive exposure after the user may have already been subjected to excessive ultraviolet exposure. On a cloudy day, a user may avoid excessive ultraviolet exposure outdoors over several hours (e.g., four hours). Thus, if the light exposure device were to calculate the current ultraviolet index and/or project ultraviolet exposure inaccurately, the light exposure device can needlessly alert the user of excessive exposure well before the user may experience sunburn from excessive ultraviolet exposure. Thus, the light exposure device can execute the method S100 to promptly warn a user of risk of sunburn while avoiding irritating the user with superfluous alerts.

2.2 Applications: Opportunistic Readings

The method S100 can also be implemented to opportunistically record ultraviolet values when conditions defined by the light exposure device are met, such as when inadvertent movement of the light exposure device by the user aligns its integrated ultraviolet sensor to precalculated direct, diffuse, and global orientations, thereby reducing or eliminating a need for the user to manually and intentionally orient the light exposure device in preparation for such readings, which may otherwise frustrate the user, limit use of the light exposure device over time, and reduce accuracy of the user's ultraviolet exposure calculated by the light exposure device over time due to low repeatability and high degrees of error in manual in positioning of the light exposure device by a user.

In one implementation, orientation sensors (e.g., a multi-axis gyroscope, compass, accelerometer, and/or tilt sensor) integrated into the light exposure device can output yaw, pitch, and roll orientations of the light exposure device, such as relative to the reference frame of the Earth or relative to an arbitrarily-defined reference frame. For example, the light exposure device can include a compass sensor, a multi-axis tilt sensor or accelerometer, and a multi-axis gyroscopic sensor; and the light exposure device can fuse an absolute compass direction output by the compass, angular velocity values output by the gyroscopic sensor, and acceleration values output by the tilt sensor or accelerometer into a pitch, yaw, and roll position of the light exposure device relative an Earth reference frame per sampling interval. From the solar position, the light exposure device can define a target direct orientation for the light exposure device, such that, when outputs of these sensors indicate that the light exposure device is aligned with the target direct orientation, an ultraviolet sensor integrated into the light exposure device is directed orthogonal the Sun.

In particular, rather than prompting a user wearing (or carrying) the light exposure device to manually align the light exposure device with the target direct orientation during a sampling interval, the light exposure device can: intermittently wake from a sleep state to collect ultraviolet data (e.g., once per fifteen-minute interval); define target direct, diffuse, and/or global orientations for collection of ultraviolet values during this interval; regularly sample the orientation sensors during this interval to monitor the orientation of the light exposure device; automatically record ultraviolet values from the ultraviolet sensor in response to the orientation of the light exposure device falling within a threshold difference from each of the target direct orientation, the target diffuse orientation, and/or the global orientation; transform these ultraviolet values into a ultraviolet radiation exposure value for the user for this interval; and then return to the sleep state. The light exposure device can repeat this cycle over time, such as during known daylight hours for the current date and location of the light exposure device, and aggregate ultraviolet radiation exposure values for each interval during a single day into a cumulative ultraviolet radiation exposure value for the user for this day.

For example, the user may rotate the light exposure device into the target global orientation while opening a door or performing any other task; in response to detecting that its orientation has fallen within a threshold difference of the target direct orientation (or a range of direct orientations) for the current time of day, date, and approximate geolocation of the light exposure device, the light exposure device can record a global ultraviolet value. The light exposure device can similarly record ultraviolet values when the detected orientation of the light exposure device falls within threshold differences of the target direct and diffuse orientations. (However, the light exposure device can opportunistically collect ultraviolet data for other target orientations of the light exposure device based on predicted positions of the Sun relative to Earth at corresponding times of day, days of the year, and locations stored on the light exposure device.)

Figure 2:
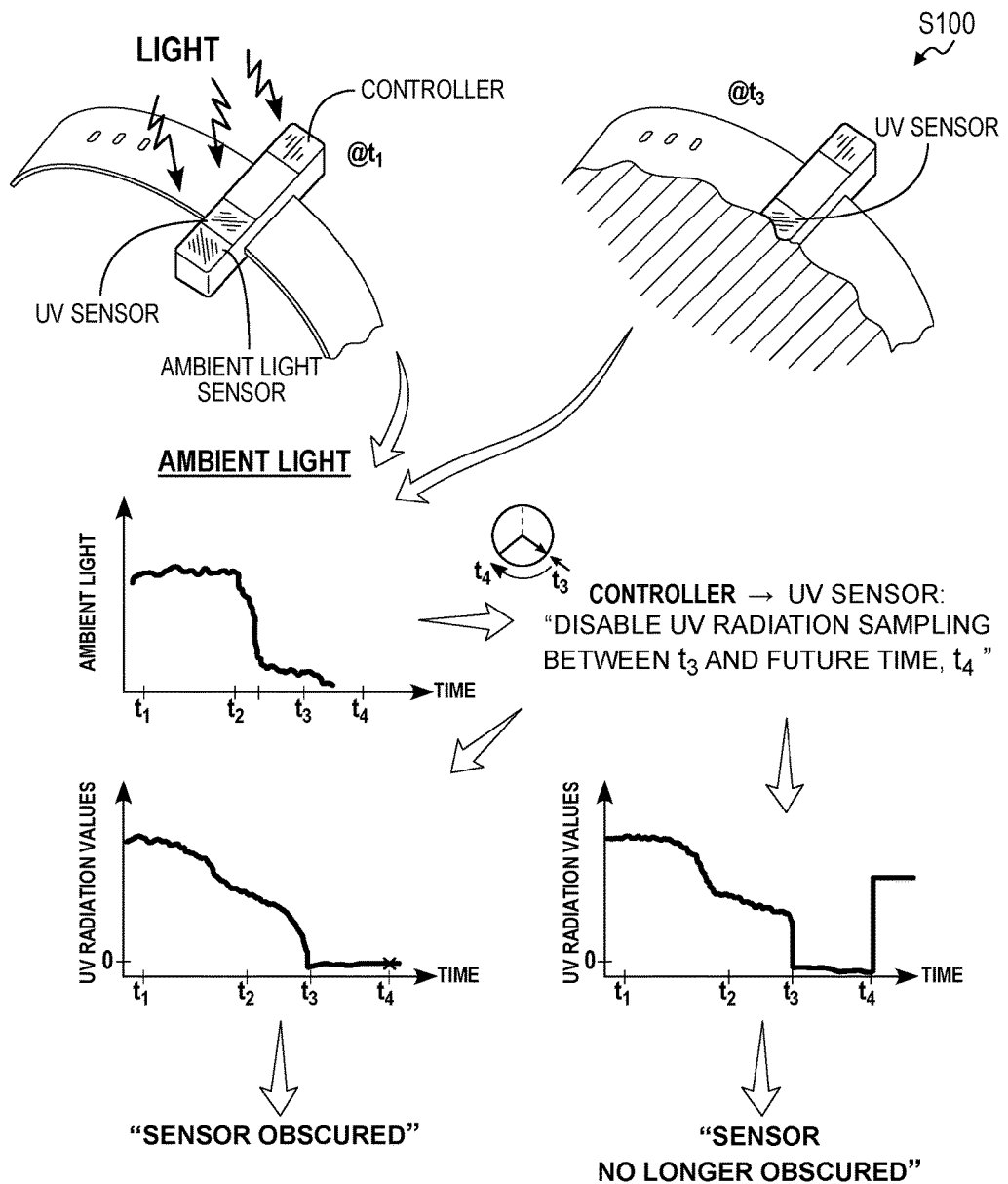
FIG. 2 is a flowchart representation of the first method.

As shown in FIG. 2, the light exposure device can also include an ambient light sensor configured to output a signal corresponding to a level of incident ambient (visible) light and arranged proximal the ultraviolet sensor in the light exposure device. For example, in response to lack of a signal from the ambient light sensor during known daylight hours at the current time and location of the light exposure device, the light exposure device can determine that the ambient light sensor is obscured, such as by a sleeve covering a wrist on which the light exposure device is worn by a user. Because the ambient light sensor is adjacent the ultraviolet sensor, obfuscation of the ambient light sensor may indicate similar obstruction of the ultraviolet sensor. Therefore, the light exposure device can postpone or cancel collection of ultraviolet data during a current sampling interval while the ambient light sensor is obstructed, thereby avoiding recordation of aberrant or irrelevant ultraviolet values when conditions surrounding the ultraviolet sensor are unfavorable to collection of accurate sensor data.

In the foregoing example, the light exposure device can also detect presence of ambient light based on an output of the ambient light sensor, confirm that the ambient light and ultraviolet sensors are not obscured, and then enable collection of ultraviolet data through the ultraviolet sensor. (Similarly, the light exposure device can concurrently sample the ambient light sensor and the ultraviolet sensor when the light exposure device aligns with a target orientation and then retroactively confirm that the ultraviolet sensor was not obscured during this sampling interval based on an ambient light level read from the ambient light sensor during this same sampling interval.) However, in response to detecting the presence of ambient light but little or no ultraviolet radiation (e.g., UVB specifically, which may penetrate fused silica and fused quartz but may not penetrate other common glasses), the light exposure device can determine that it is located indoors and estimate the user's ultraviolet radiation exposure at null until an increase in detected incident ultraviolet radiation—indicating that the light exposure device is outdoors—is recorded.

Furthermore, the ambient light sensor can cooperate with the ultraviolet sensor to prioritize target orientations for recording ultraviolet values. For example, in response to detecting the presence of ambient light, the light exposure device can record a direct ultraviolet value in response to detecting its alignment with the target direct orientation, a diffuse ultraviolet value in response to detecting its alignment with the target diffuse orientation, and a global ultraviolet value in response to detecting its alignment with the target global orientation. In this example, the light exposure device can determine that the direct ultraviolet value corresponds to an ultraviolet index significantly less than ultraviolet indices corresponding to the global and diffuse ultraviolet values. Thus, the light exposure device can determine that its location is outside yet away from direct sunlight, such as in a shaded area or under overcast skies, and can temporarily reject direct ultraviolet values recorded by the ultraviolet sensor, thereby applying the direct and diffuse ultraviolet values to calculate a current ultraviolet index based on shade or cloudy sky sun exposure models and algorithms.

2.3 Applications: Efficiency & Resource Conservation

Additionally, the light exposure device can implement Blocks of the method S100 to limit processing load and energy consumption by: intermittently recording targeted ultraviolet values once per discrete sampling interval (e.g., once per fifteen-minute or one-hour interval); processing global, direct, and/or diffuse ultraviolet values read during a sampling interval to determine an ultraviolet index at the location of the light exposure device at one instance in this sampling interval; selecting a particular, predefined ultraviolet index model—from a set of such ultraviolet index models—based on this calculated ultraviolet index; and implementing this one ultraviolet index model to anticipate ultraviolet indices around the light exposure device during the remainder of the sampling interval and until a next set of global, direct, and/or diffuse ultraviolet values read are recorded during a next sampling interval.

Generally, the light exposure device can implement Blocks of the method S100 to conserve energy by avoiding continuous sampling of the ultraviolet sensor and instead: intermittently, opportunistically, and actively recording ultraviolet values at target orientations at discrete sampling intervals; selecting a relevant ultraviolet index model (e.g., an ultraviolet index curve) with an implicit modeling error less than measurement error of orientation and position sensors of the light exposure device based on ultraviolet values recorded by the light exposure device during a sampling interval; and then passively implementing this ultraviolet index model to predict the user's ultraviolet radiation exposure until a next sampling interval. In this next sampling interval, the light exposure device can again record a new set of ultraviolet values, select the same or other most appropriate ultraviolet index model based on these new ultraviolet values, and the implement this new ultraviolet index model to project the user's ultraviolet radiation exposure during the next sampling interval.

Thus, the light exposure device can be configured to track the user's ultraviolet radiation exposure over a long period of time (e.g., one week or one month) without necessitating that its battery be recharged, thereby minimizing dependence on a user to charge the light exposure device over time. Nevertheless, by implementing the method S100, the light exposure device can collect accurate ultraviolet data and transform these data into accurate estimations of a user's cumulative ultraviolet radiation exposure over a period of time (e.g., one day, one week).

However, Blocks of the method S100 can be implemented in any other way and by any other discrete light exposure device, wearable device, or mobile computing device, etc. to calculate a highly accurate estimation of a user's cumulative ultraviolet exposure while reducing processing power, extending battery life, and limiting or eliminating manual involvement of the user.

3. System

Figure 5:
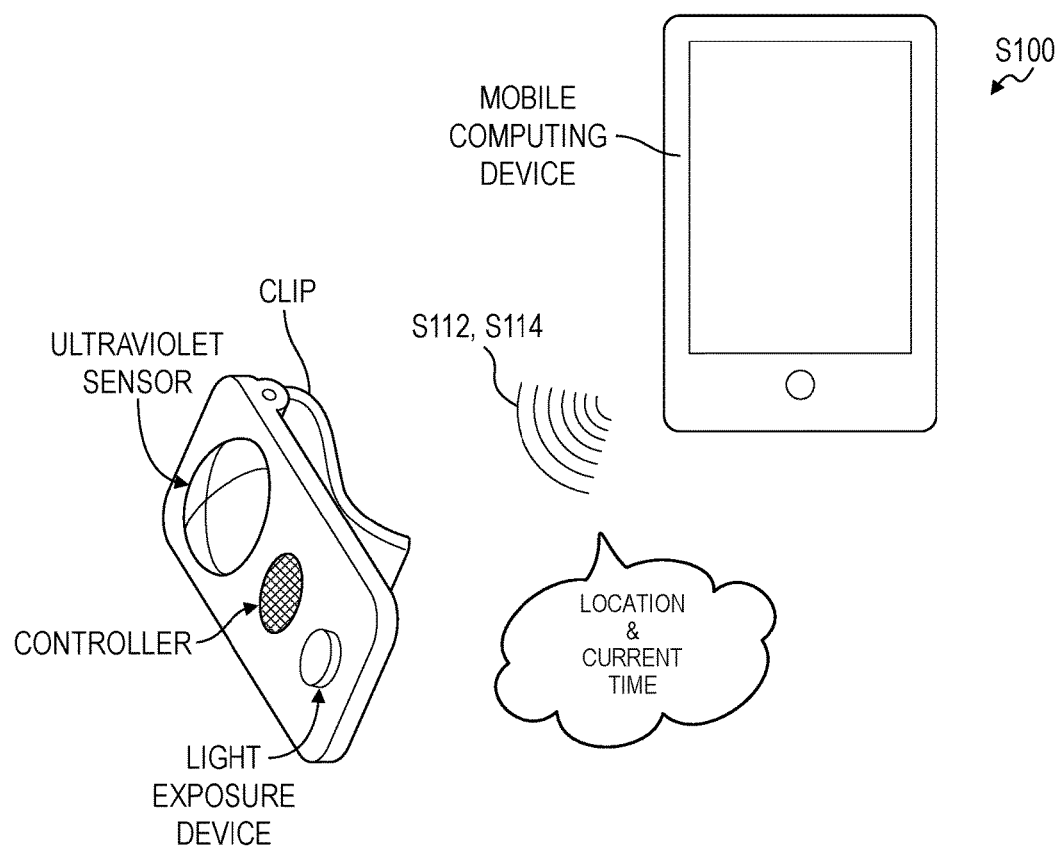
FIG. 5 is a schematic representation of the first method.

As shown in FIGS. 1A, 1B, and 5, Blocks S112 and S114 of the method S100 are described herein as executed by a mobile computing device, such as a mobile phone, a wearable computing device (e.g., a "smartwatch"), a tablet, a desktop or laptop computer, or any other suitable computer system equipped to access and transmit location data to the light exposure device. For example, the mobile computing device can: include a GPS receiver and/or any other geospatial location module configured to identify a geolocation of the mobile computing device; and a short-range wireless communication module configured to establish a local wireless connection with the light exposure device.

Blocks S122-S150 of the method S100 can be executed by a light exposure device, such as a wearable computing device, a smartphone, an ultraviolet-sensitive band; a pin, button, and/or brooch; smart glass wear; a smart ring; and/or any other portable computing device configured to record ultraviolet values.

The mobile computing device can interface and cooperate with a light exposure device to execute Blocks of the method S100. In one implementation, the mobile computing device can transmit location data to the light exposure device, such as over a wireless network or local area network. Thus, the mobile computing device and the light exposure device can include wireless communications modules configured to send and receive data.

Alternatively, the light exposure device can be integrated into the mobile computing device, such that the light exposure device includes a GPS receiver and/or any other location-detecting module configured to identify a geolocation of the mobile computing device. For example, the light exposure device can be a GPS-enabled smartwatch worn by a user. In this example, the light exposure device can access its location without assistance from or wireless communication with a secondary mobile computing device.

In one implementation, the light exposure device includes: a housing, such as a plastic injection-molded and thermoplastic elastomer (TPE) over-molded housing; an ultraviolet sensor, such as a digital ultraviolet (UV) index photodiode light sensor or other optical ultraviolet sensor, adjacent a UV-transparent region of an outer surface of the housing; memory arranged in the housing; a controller arranged in the housing and configured to sample the ultraviolet sensor and other sensors housed within the light exposure device and to store incident solar radiation data to memory; a wireless communication module arranged in the housing and configured to receive location data from a local mobile computing device and transmit solar radiation data to a local mobile computing device, such as in real-time, intermittently (e.g., one per three-minute interval), or asynchronously (e.g., after establishing a wireless connection between the mobile computing device and the light exposure device); and a rechargeable battery arranged in the housing configured to power the controller, sensors, and the wireless communication model.

3.1 Sensors: Orientation and Motion

The light exposure device can include motion and orientation sensors configured to record pitch, yaw, and roll orientations of the light exposure device, such as relative to the reference frame of the Earth or to an arbitrarily-defined reference frame. Thus, the light exposure device can also include an accelerometer or tilt sensor configured to detect pitch and roll orientations of the light exposure device; a compass sensor (e.g., a compass sensor) configured to detect yaw orientation of the light exposure device; and a gyro sensor or angular velocity sensor configured to detect a rate of angular pitch, roll, and yaw motion. In one implementation, the controller can thus transition from an inactive (e.g., "sleep" or "hibernate") low power mode to an active mode responsive to an output of the motion sensor and/or predict an activity of the user wearing the exposure-tracking module based on a magnitude and/or frequency of outputs of the motion and orientation sensors.

3.2 Ultraviolet Sensor

The light exposure device also includes an ultraviolet sensor configured to output a signal proportional to incident ultraviolet radiation. In one example, the ultraviolet sensor is broadly sensitive to ultraviolet radiation and includes an ultraviolet filter configured to pass ultraviolet radiation within a limited erythemal action spectrum and to reject ultraviolet light outside of this spectrum. The ultraviolet sensor can thus define an erythemally-filtered ultraviolet sensor. In this example, the ultraviolet filter can pass UVB (which may not pass through glass) but reject UVA (which may pass through glass); thus when the light exposure device detects ambient light at the ambient light sensor but no ultraviolet radiation at the ultraviolet sensor, the light exposure device can determine that it is occupying an indoor space. However, because UVA exposure may be proportional to UVB exposure when outdoors, the light exposure device can predict both UVA and UVB exposure of a user based on degree of UVB radiation detected at the ultraviolet sensor.

In this foregoing example, the filter can also be polarized in order to selectively pass ultraviolet radiation within a narrow range of incident angles (e.g., normal to the ultraviolet sensor ±5°) in order to increase sensitivity of a signal output by the ultraviolet sensor to its orientation. The ultraviolet sensor can additionally or alternatively include a diffuser that functions to accommodate angular misalignment of the light exposure device from a target orientation by funneling ultraviolet radiation over a wider angular window into a sensing element in the ultraviolet sensor.

However, the light exposure device can include any other type and/or quantity of ultraviolet sensor.

3.3 Ambient Light Sensor

Additionally, as shown in FIG. 2, the light exposure device can include an ambient light sensor, such as a photodiode, photodetector, phototransistor, or any other optical sensor configured to detect the presence and/or absence of light. The light exposure device can be arranged within the housing of the light exposure device adjacent an optically transparent screen or an optically translucent diffuser screen integrated into an outer surface of the housing. The diffuser screen can be configured to scatter incident ambient light to yield an effective optical "averaging" effect on incoming light sources.

As described below, the controller can transition from an inactive (e.g., "sleep" or "hibernate" or "low power") mode to an active mode and can transition sensors within the light exposure device from inactive to active, responsive to an output of the ambient light sensor indicating presence of light proximal the light exposure device. Likewise, the controller can transition from an active mode to an inactive mode and can transition sensors within the light exposure device from active to inactive, responsive to an output of the ambient light sensor indicating absence of light proximal the light exposure device.

3.4 Additional Sensors

Additionally or alternatively, the light exposure device can include additional sensors, such as an ambient temperature sensor, a humidity sensor, a heart-rate monitoring sensor, a skin temperature sensor, an infrared (IR) irradiance sensor, a visible light irradiance sensor, an altimeter, a barometer, a moisture or water exposure sensor, any other ambient condition sensor configured to record parameters of ambient conditions surrounding the light exposure device, and/or any other biometric sensor configured to record biometric parameters of a user associated with the light exposure device.

4. Location

Blocks S112 and S114 of method S100 recite accessing a location of the light exposure device. Generally, in Blocks S112 and S114, the mobile computing device can access a geolocation of the mobile computing device, such as through a global positioning system (i.e., "GPS") receiver integrated into the mobile computing device, and distribute the geolocation of the mobile computing device to the light exposure device, such as through the wireless communication portal and over a wireless communication network between the mobile computing device and the light exposure device. The mobile computing device can be configured to transmit location data to the light exposure device in real-time, intermittently (e.g., one per three-minute interval), and/or asynchronously (e.g., after establishing a wireless connection between the mobile computing device and the light exposure device).

If the light exposure device remains within an effectively-small local geolocation area (e.g., relative to azimuth and zenith angles of the apparent position of the Sun in the sky, or approximately a thirty-mile radius), the mobile computing device can disable transmission of the location to the light exposure device. For example, at a first time, the mobile computing device can access a GPS location of the mobile computing device indicating the mobile computing device is in San Francisco and transmit the GPS location to the light exposure device over a wireless connection between the mobile computing device and the light exposure device. In this example, for a week succeeding the first time, the light exposure device and mobile computing device travel around San Francisco but remain within the city limit of San Francisco. During the week, the mobile computing device can disable transmission of the GPS location of the mobile computing device. Thus, the light exposure device can apply a general location of the light exposure device (i.e., San Francisco) to a solar position model to calculate the approximate solar position for discrete times of day in and around San Francisco. However, one week after the geolocation event, the mobile computing device can detect, through a GPS module, relocation of the mobile computing device to San Jose, approximately fifty miles south of San Francisco. In response to relocation of the mobile computing device outside of San Francisco, the mobile computing device can transmit an updated location (i.e., a GPS location within San Jose) to the light exposure device. Thus, after relocation of the mobile computing device and the light exposure device to San Jose, the light exposure device can apply this new location of the light exposure device (i.e., San Jose) to a solar position model to calculate the solar position for discrete times of day in and around San Jose. Furthermore, by intermittently transmitting GPS locations from the mobile computing device to the light exposure device, the mobile computing device and the light exposure device can limit wireless connectivity therebetween, which may limit power consumption and extend battery life at the light exposure device. Therefore, a user may carry the light exposure device without carrying the mobile computing device alongside the light exposure device while still recording accurate and relevant ultraviolet values.

In another example, the mobile computing device can transmit a location of the mobile computing device indicating it is currently located in Boulder, Colo. From this location and the current calendar date the light exposure device can estimate a solar position at 10:42 AM on 21 Jul. 2017 in Boulder, Colo. which includes a solar azimuth component (i.e., an angle, in a plane defined by a horizon at a particular location, defined between a vector directed toward the Sun and true north) of 111.35 degrees, a solar elevation component (i.e., an angle defined perpendicular the horizon and between the horizon and the vector directed toward the Sun) of 53-39 degrees, a solar declination component of 20.48 degrees, and a cosine of a solar zenith of 0.8027.

In one implementation, the mobile computing device can track the location of the mobile computing device and can intermittently transmit a new location to the light exposure device in response to detecting relocation of the mobile computing device more than a threshold distance (e.g., more than thirty miles). In particular, relocation of the light exposure device 70 miles from its last stored location may yield a difference of approximately 1° in the zenith for a target direct orientation calculated by the light exposure device in Block S122. Similarly, the disk of the Sun subtends approximately 0.5°; the target direct orientation calculated by the light exposure device in Block S122 and defining intended alignment between the ultraviolet sensor in the light exposure device and the center of the Sun may instead place the edge of the sun in the center of the field of view of the ultraviolet sensor when the light exposure device is oriented in this target direct orientation if the light exposure device is offset from its last stored location by approximately seventeen miles. Thus, the mobile computing device can function to update location data implemented by the light exposure device to calculate an approximate solar position. Within a threshold distance or area (e.g. forty square miles), the light exposure device can approximate a solar position of the Sun that will be substantially uniform, for a given date and time. However, outside the threshold distance or area, the light exposure device can calculate an error due to consistent offset of the approximate solar position calculated by the light exposure device and an actual solar position detected by ultraviolet values recorded by the ultraviolet sensor and by ambient light sensor values recorded by the ambient light sensor. Thus, in response to relocation of the mobile computing device outside of the threshold distance or range, the mobile computing device can update location information applied by the light exposure device to calculate the solar position.

Additionally, the mobile computing device can transmit a current time recorded at the mobile computing device to the light exposure device. In one implementation, the light exposure device can include an integrated clock or timing device. In response to establishment of a connection between the light exposure device and the mobile computing device, the mobile computing device can synchronize the integrated clock of the light exposure device with a current time recorded at the mobile computing device. In this implementation, the mobile computing device can intermittently update a current time (e.g., current UTC time) at the light exposure device in order to improve accuracy of solar position calculations executed by the controller of the light exposure device based on current time and current location of the light exposure device.

Alternatively, the light exposure device can access a current location of the light exposure device entered (e.g., manually) by a user into the mobile computing device and/or the light exposure device. For example, the user may input an instant zip code, city and state, longitude and latitude, etc. into the mobile computing device and/or the light exposure device. The light exposure device can also access its current location from other external devices, such as a cellular tower, Wi-Fi hub, or local wireless network, etc.

4. Target Orientations

Block S122 and S124 of the method S100 recite calculating a target direct orientation of the light exposure device based on the first location, a current time and current date, and a direct solar position model, the ultraviolet sensor approximately normal the Sun when the light exposure device occupies the target direct orientation at approximately the current time in Block S122; calculating a target diffuse orientation of the light exposure device based on the first location, the current time and date, and a diffuse solar position model, the ultraviolet sensor biased away from the Sun when the light exposure device occupies the target diffuse orientation at approximately the current time in Block S124. Generally, Blocks S122 and S124 function to calculate target orientations (e.g., target global, target direct, and target diffuse orientations) or orientation ranges based on the solar position and at which the light exposure device can record targeted ultraviolet values from the ultraviolet sensor in order to calculate an accurate local ultraviolet index.

Block S122 of the method S100 can be implemented by the light exposure device to calculate a target direct orientation based on the time and date of the current sampling interval and the current location of the light exposure device (e.g., the location received from the mobile device). When the light exposure device occupies this target direct orientation within the current sampling interval, the Sun is located within (or very near) the field of view of the ultraviolet sensor. To define the target direct orientation, the light exposure device can calculate a solar position (i.e., a position of the Sun relative to the user's reference frame on the Earth) based on the location of the light exposure device and a current time and date, as described above. The light exposure device can then calculate an orientation of the light exposure device at which the field of view of the ultraviolet sensor points directly toward the Sun. Thus, when the light exposure device is aligned with the target direct orientation, a vector normal to the ultraviolet sensor may point (nearly) directly toward the center of the Sun, thereby yielding a (near) maximum detectable ultraviolet value for this sampling interval. For example, the light exposure device can predict yaw, pitch, and roll positions (i.e., angular orientations in three degrees of freedom relative to the light exposure device's current reference frame) at which the ultraviolet sensor will be directed toward the Sun during the current sampling interval given the current time, date, and location of the light exposure device and store these yaw, pitch, and roll positions as the target direct orientation for this sampling interval.

Alternatively, the light exposure device can define a range of orientations (i.e., a target direct orientation window) surrounding the target direct orientation such that over the range of orientations, the light exposure device is directed toward the Sun or directed toward a point in the sky within a threshold offset from the Sun. For example, the light exposure device can calculate a target direct orientation corresponding with a solar position defined by a solar altitude of 38.72 degrees and a solar azimuth of 263.57 degrees for the light exposure device location in San Francisco. Thus, the light exposure device can define the target direct orientation along a vector oriented 38.72 degrees above a horizon and 236.57 degrees from a cardinal North direction. Furthermore, the light exposure device can define a target direct orientation range encompassing an area surrounding the target direct orientation, a boundary of the target direct orientation range offset ten degrees from the target direct orientation, effectively defining a conic target orientation window with an included angle of twenty degrees.

The light exposure device can also calculate a target global orientation directed straight upward (i.e., perpendicular a horizon) for measuring ultraviolet values recorded by the ultraviolet sensor. Thus, the light exposure device can implement Blocks of the method S100 to define the target global orientation, at which the ultraviolet sensor can record ultraviolet values, to be agnostic to an orientation of the Sun. Thus, ultraviolet values recorded by the light exposure device when aligned with the target global orientation can vary as the solar position changes during a day.

Alternatively, the light exposure device can calculate a range of orientations (i.e., a target global orientation window) surrounding the target global orientation such that over the range of orientations, the light exposure device is directed straight upward or at a slight angle to a vertical line directed straight upward toward the sky. Thus, the light exposure device can calculate a target global orientation range encompassing an area surrounding the target global orientation, such that the light exposure device can be slightly biased away from the target global orientation and still record an accurate and accepted ultraviolet value.

The light exposure device can also implement Block S124 of the method S100 to calculate a target diffuse orientation directed toward a point in the sky biased away from the Sun. For example, the light exposure device can define the target diffuse orientation: that is angularly offset by at least 50° from the direct vector (e.g., current azimuth and zenith angle) toward the Sun to minimize an effect of low-angle direct sunlight on a diffuser in the ultraviolet sensor; and angularly offset above horizon by at least 15° to confirm that the ultraviolet sensor is facing the sky and not a hill or mountain. Therefore, the light exposure device can define a target diffuse orientation "window" or "zone" containing the whole the sky visible locally, less a sector below 15° above the horizon and less a sector ±50° from the current azimuth of the Sun. The light exposure device can thus define a target diffuse orientation window: that approximates an annular zone at solar noon it; and that represents dome less a circular "keep-out" region proximal one edge of the dome centered on the Sun.

However, the light exposure device can implement any other methods or techniques in Blocks S122 and S124 to define discrete target orientations or orientation windows in which the light exposure device may opportunistically record ultraviolet values. The light exposure device can repeat this process to calculate new target orientations or orientation windows for each sampling interval (e.g., once per fifteen-minute interval) based on a time and date representative of the sampling interval and based on an approximate location of the light exposure device during the sampling interval.

5. Triggers & Ultraviolet Sampling

Blocks S142, S144, and S146 of the method S100 recite, in response to detecting alignment between orientation of the light exposure device and the target direct orientation at approximately the current time, recording a direct ultraviolet value read from the ultraviolet sensor in Block S142; in response to detecting alignment between orientation of the light exposure device and the target diffuse orientation at approximately the current time, recording a diffuse ultraviolet value read from the ultraviolet sensor in Block S144; in response to detecting alignment between orientation of the light exposure device and a target global orientation at approximately the current time, recording a global ultraviolet value read from the ultraviolet sensor in Block S146. Generally, Blocks S142, S144, and S146 of the method S100 function to measure ultraviolet values when the light exposure device is aligned with predefined target orientations or target orientation ranges. Thus, Blocks S142, S144, and S146 of the method S100 function to avoid continuous sampling of the ultraviolet sensor and still record accepted ultraviolet values, which can be used to calculate an ultraviolet index and project future ultraviolet values.

4.1 Orientation Triggers

In response to detecting alignment between orientation of the light exposure device and the target direct orientation at approximately the current time (or within a sampling interval succeeding the first time), the method S100 can be implemented to record a first value read from the ultraviolet sensor as a direct ultraviolet value. Generally, in Block S142, the light exposure device can: regularly sample (e.g., at a rate of 10 Hz) orientation sensors integrated into the light exposure device to determine the orientation of the ultraviolet light exposure device relative to a reference frame; read an ultraviolet value from the ultraviolet sensor when alignment between the detected orientation of the light exposure device falls within a tolerance of a target direct orientation (or within a target direct orientation window) calculated for the current sampling interval in Block S122; and then store this ultraviolet value as a direct ultraviolet value (e.g., a ultraviolet irradiance value in Watts per square meter) for this sampling interval.

In one variation, the light exposure device can: read a sequence of ultraviolet values from the ultraviolet sensor as the light exposure device sweeps through the direct orientation window, such as at a rate of 10 Hz; and then store a singular maximum ultraviolet value in this sequence of ultraviolet values as the direct ultraviolet value for this sampling interval.

Similarly, the light exposure device can: read a sequence of ultraviolet values from the ultraviolet sensor as the light exposure device sweeps through the direct orientation window, such as at a rate of 10 Hz; tag each ultraviolet value in this sequence with an orientation of the light exposure device relative to the reference frame; and then store a singular ultraviolet value in this sequence of ultraviolet values tagged with an orientation nearest a target orientation as the direct ultraviolet value for this sampling interval.

Alternatively, the light exposure device can: record a first ultraviolet value read from the ultraviolet sensor once the light exposure device enters an initial direct orientation window (e.g., defined by a 15° cone axially aligned with a target direct orientation); recalculate a second, tighter direct orientation window (e.g., defined by a 10° cone axially aligned with a target direct orientation); replace the first ultraviolet value with a second ultraviolet value read from the ultraviolet sensor once the light exposure device enters the second direct orientation window; recalculate a third, tighter direct orientation window (e.g., defined by a 5° cone axially aligned with a target direct orientation); replace the second ultraviolet value with a third ultraviolet value read from the ultraviolet sensor once the light exposure device enters the third direct orientation window; etc. during the sampling interval, thereby refining and increasing accuracy of a direct ultraviolet value recorded for this sampling interval, as described below.

The light exposure device can implement similar methods and techniques to record (and refine) a global ultraviolet value and a diffuse ultraviolet value during a sampling interval.

4.2 Timing Triggers

Additionally or alternatively, the controller of the light exposure device can initiate and disable recording of ultraviolet values according to a schedule or timing scheme defined by and executed by the controller. Generally, the light exposure device can implement Blocks of the method S100 to avoid recording extraneous and/or irrelevant ultraviolet values when ambient conditions may be adverse to recording advantageous ultraviolet values.

For example, the light exposure device can define (and/or access) a predicted ultraviolet value schedule, estimating ultraviolet values over times of the day for a current location of the light exposure device. During a night period (e.g., between sunset and sunrise), the light exposure device can predict extremely low ultraviolet values. Thus, the light exposure device can calculate an inactive period (e.g., the night period) over which the first ultraviolet index exposure curve predicts ultraviolet indices less than a threshold ultraviolet index. Thus, the light exposure device can operate in the low-power mode during the inactive period (e.g., during the night period) and estimate an ultraviolet exposure of null over the inactive period. Furthermore, the light exposure device can reactivate the ultraviolet sensor at the end of the night period (i.e., during a day period). Similarly, under certain date, time, and location conditions, the local ultraviolet index may be so low as to be insignificant, such as just after sunrise or just before sunset in winter; the light exposure device can thus deactivate (i.e., not sample) the ultraviolet sensor during such periods.

The light exposure device can record ultraviolet values (e.g., sample the ultraviolet sensor) intermittently, such as every minute, every other minute, every 15 minutes, at random, etc. Furthermore, as described below, the light exposure device can alter ultraviolet sensor sampling intervals according to parameters collected by other sensors in the light exposure device and data pulled from the mobile computing device.

Additionally or alternatively, the light exposure device can record ultraviolet values according to a schedule, such as a solar schedule or a personal calendar agenda of a user carrying the light exposure device transmitted to the light exposure device from the mobile computing device, in order to record ultraviolet values at times of known ultraviolet exposure. For example, the light exposure device can record ultraviolet values at solar noon as the light exposure device can predict maximum ultraviolet exposure at solar noon.

In another example, the light exposure device can access a personal calendar transmitted to the light exposure device from the mobile computing device. The light exposure device can detect a first event entitled "Hike with Katie" between 12:30 pm and 1:30 pm and a second event entitled "Meeting with Company A at Warehouse H" between 2:00 pm and 3:30 pm. The light exposure device can then identify that the first event is an outdoor event and can arm the ultraviolet sensor to record ultraviolet values (intermittently at intervals or continuously) between 12:30 pm and 1:30 pm. Additionally, the light exposure device can identify that the second event is an indoor event and can disable the ultraviolet sensor between 2:00 pm and 3:30 pm. Alternatively, the light exposure device can record ultraviolet values (and/or ambient light values, as described below) intermittently (e.g., every 15 minutes) between 2:00 pm and 3:30 pm to verify ultraviolet exposure throughout duration of the second event.

4.3 Ambient Light Triggers

As described above, the light exposure device can record ultraviolet values measured by the ultraviolet sensor in response to alignment of the light exposure device with particular target orientations. Additionally or alternatively, the light exposure device can initiate recording of ultraviolet values in response to the presence or absence of ambient light detected by the ambient light sensor. Similarly, the light exposure device can initiate recordation of ultraviolet values in response to changes in ambient light detected by the ambient light sensor, such as may occur when the user moves from an indoor location to an outdoor location.

For example, as described above, the light exposure device can record ambient light values with an ambient light sensor integrated into the light exposure device. At a first time, the light exposure device can record a first ambient light value read from the ambient light sensor. In response to detecting a first ambient light value less than a first threshold ambient light value, the light exposure device can identify the ultraviolet sensor as obscured; and disable the ultraviolet sensor from recording ultraviolet values because, for example, if the ambient light sensor is obscured, it is likely the ultraviolet sensor is also obscured. Thus, the light exposure device can initiate an inactive state (i.e., a sleep mode) for a particular duration by initiating a timer. After expiration of the timer, the light exposure device can record a second ambient light value read from the ambient light sensor. In response to detecting the second ambient light value exceeding a second threshold ambient light value, the light exposure device can rearm the ultraviolet sensor to read ultraviolet values. However, if the second ambient light value remains below the second threshold ambient light value, the light exposure device can reset the time and continue the sleep mode.

In a similar example, when recording a first value read from the ultraviolet sensor as the direct ultraviolet value, the light exposure device can first verify presence of ambient light, record an ambient light value detected by the ambient light sensor, and then check for alignment between a current orientation of the light exposure device and a particular target orientation (e.g., the target direct orientation). The light exposure device can also record ambient light values prior to verifying a current orientation of the light exposure device and recording global ultraviolet values and diffuse ultraviolet values.

In a similar example, in response to detecting an ambient light value exceeding a first threshold ambient light value at approximately the first time, the light exposure device can arm the controller to opportunistically record direct, diffuse, and global ultraviolet values during a subsequent sampling interval. However, in response to recording an ultraviolet value (e.g., an ultraviolet value recorded at any orientation of the light exposure device or a direct ultraviolet value and/or a diffuse ultraviolet value) that is less than a threshold ultraviolet value during this sampling interval, the light exposure device can determine that it is located indoors (e.g., inside a building) during the sampling interval and discard these ultraviolet values as not representative of (significant) sun exposure. Therefore, if the light exposure device detects incident ambient light above a threshold ambient level but fails to detect incident ultraviolet light above a threshold ultraviolet level during a daylight period (e.g., from 6 AM until 7 PM), the light exposure device can determine that it is located indoors and discard ultraviolet values read during this sampling interval.

Similarly, if the incident ambient light and ultraviolet levels are both less than corresponding threshold levels during a daylight period, the light exposure device can determine that the ambient light sensor and ultraviolet sensor are obscured, such as by a shirt sleeve; the light exposure device can discard these ultraviolet data accordingly and/or serve a prompt to the user—such as through the user's mobile computing device—to correct obfuscation of these sensors. However, if the incident ambient light and ultraviolet levels exceed corresponding threshold levels during a daylight period, the light exposure device can: confirm that the light exposure device is located outside; and transition to opportunistically recording direct and diffuse ultraviolet values when the light exposure device is properly oriented during this sampling interval. (Alternatively, the light exposure device can store these ultraviolet values directly if these ultraviolet values were recorded when the light exposure device was properly oriented.)

Therefore, the light exposure device can confirm its location as indoors, obscured, or outdoors based on ambient and ultraviolet data collected for any orientation of the light exposure device or any orientation of the light exposure device that places the ambient light sensor and ultraviolet sensor facing upward; the light exposure device can then selectively execute a sampling routine to opportunistically collect ultraviolet data from the light exposure device when it is confirmed to be outside. Alternatively, the light exposure device can: record an ambient light level with each ultraviolet value collected opportunistically when the orientation of the light exposure device matches (within a preset tolerance) a target orientation; and can merge these ambient and ultraviolet data to confirm that the light exposure device was located outdoors when this ultraviolet value was recorded before storing this ultraviolet value in memory and implement this ultraviolet value to estimate the user's ultraviolet exposure, as described below.

4.4 Location Trigger

Additionally or alternatively, the light exposure device can initiate and disable recording of ultraviolet values in response to detecting (e.g., at the mobile computing device) the light exposure device in a particular location or detecting relocation of the light exposure device beyond a threshold range.

For example, the mobile computing device can detect relocation of the mobile computing device from a first location to a second location at a second time and transmit the second location and the second time to the light exposure device. In response to detecting relocation of the mobile computing device from the first location to a second location greater than a threshold distance (e.g., one mile) from the first location through sensor data (e.g., data collected by a GPS receiver at the mobile computing device), the light exposure device can: calculate a second target direct orientation of the light exposure device based on the second location, at the second time, and the direct solar position model, the ultraviolet sensor approximately normal the Sun when the light exposure device occupies the second target direct orientation at approximately the second time; and calculate a second target diffuse orientation of the light exposure device based on the second location, the second time, and the diffuse solar position model, the ultraviolet sensor biased away from the Sun when the light exposure device occupies the second target diffuse orientation at approximately the second time. As described above, in response to detecting alignment between orientation of the light exposure device and the second target direct orientation at approximately the second time, the light exposure device can record a fourth value read from the ultraviolet sensor as a second direct ultraviolet value; in response to detecting alignment between orientation of the light exposure device and the second target diffuse orientation at approximately the second time, the light exposure device can record a fifth value read from the ultraviolet sensor as a second diffuse ultraviolet value; and, in response to detecting alignment between orientation of the light exposure device and a second target global orientation at approximately the second time, the light exposure device can record a sixth value read from the ultraviolet sensor as a second global ultraviolet value. From the second direct orientation, the second diffuse orientation, and the second global orientation, the light exposure device can calculate a second ultraviolet index at the light exposure device.

Alternatively, the light exposure device can implement the method S100 to define its location and, based on its location, trigger ultraviolet radiation sampling by the ultraviolet radiation sensor. For example, in response to detecting an ambient light value exceeding a first threshold ambient light value at approximately the first time, the light exposure device can record the first ambient light value; and, in response to detecting the direct ultraviolet value less than a threshold direct ultraviolet value and the diffuse ultraviolet value less than a threshold diffuse ultraviolet value at approximately the first time: locate the light exposure device in an indoor location (e.g., inside a building) at approximately the first time; and disable the ultraviolet sensor for a period of time. At the end of the period of time, the light exposure device can record a third ambient light value read from the ambient light sensor; and, in response to detecting a third ambient light value exceeding a third threshold ambient light value (i.e., in response to detecting relocation of the light exposure device to an area where the light exposure device is exposed to ultraviolet radiation), transitioning the ultraviolet sensor out of a low-power mode to read ultraviolet values.

4.5 Weather Trigger

The light exposure device can also initiate and disable recording of ultraviolet values in response to weather data received from the mobile computing device.

For example, the mobile computing device can access weather data, such as weather forecasts, Doppler radar information, etc., for the first location and transmit the weather data to the light exposure device. In response to receiving an indication of a change in local weather, such as cloud-cover or precipitation proximal the first location (approximately) occupied by the light exposure device, the light exposure device can: recalculate target diffuse and direct orientations to target recordation of ultraviolet values when the ultraviolet sensor is facing a known atmospheric type or known surface type in the sky (e.g., open sky, a cloud); select an alternate model for associating direct, diffuse, and/or global ultraviolet values with a predefined ultraviolet index curve; match direct, diffuse, and/or global ultraviolet values for the current sapling interval to an ultraviolet index curve associated with a current weather condition; set a sampling rate proportional to or set a length of a sampling interval inversely proportional to clarity of local skies, as indicated by local weather conditions (e.g., to set a thirty-minute interval in the presence of cloudy or overcast skies and five-minute intervals in the presence of harsh sunlight on a clear day).

4.5 Motion

In one variation, the light exposure device can sample the orientation and ultraviolet sensors at a rate proportional to motion (e.g., acceleration) of the light exposure device. In particular, because greater motion of the light exposure device may place the light exposure device in alignment with a target orientation or orientation window with greater frequency, the light exposure device can sample the orientation sensors with greater frequency during such high-motion periods and then record ultraviolet values through the ultraviolet sensor when the proper alignment of the light exposure device is detected. Similarly, when the light exposure device is not moving or moving only minimally, the probability that the light exposure device will enter a target orientation or orientation window may be relatively low; the light exposure device can therefore not sample or sample only at a low frequency the orientation and ultraviolet sensors.

4.6 Tuning Orientation Windows

As described above, the light exposure device can define target orientation windows (e.g., a target direct orientation window, a target diffuse orientation window, and/or a target global orientation window) over which the light exposure device remains within a threshold range of the target orientation. However, the light exposure device can reduce a range of the target orientation window in response to detecting a ultraviolet value within the target orientation window, such that a first offset of a boundary of the range of the target orientation window from the target orientation is greater than a second offset of the ultraviolet value from the target orientation. Therefore, the light exposure device can narrow ranges over which ultraviolet values are recorded by the ultraviolet sensor to improve accuracy and reduce measurement error induced from discrepancies between measurement orientations and target orientations.

5. Location Change

The mobile computing device can detect relocation of the mobile computing device: from a first location at which the mobile computing device last uploaded its location to the light exposure device nearby (e.g., over short-range wireless communication protocol or a local wireless network); to a second location that is offset from the first location by more than a threshold distance (e.g., twenty miles) at a later time. In this example, the mobile computing device can then transmit the second location to the light exposure device. At a later time, the light exposure device can then repeat Block S122 to calculate a second target direct orientation of the light exposure device based on the approximate position of the Sun relative to the second location at this later time, as calculated with the direct solar position model. Similarly, at this later time, the light exposure device can repeat Block S124 to calculate a second target diffuse orientation of the light exposure device based on the second location, this later time, and the diffuse solar position model.

The light exposure device can then opportunistically record ultraviolet values when the light exposure device is approximately oriented in the target direct orientation (i.e., the ultraviolet sensor is facing approximately directly into the Sun), when the light exposure device is approximately oriented in the target global orientation (i.e., the ultraviolet sensor is facing approximately normal to the surface of the Earth), and when the light exposure device is approximately oriented in the target diffuse orientation (i.e., the ultraviolet sensor is facing the sky but away from the Sun) during a concurrent sampling interval. In particular and as described above, in response to detecting alignment between orientation of the light exposure device and the second target direct orientation at approximately the second time, the light exposure device can record a fourth value read from the ultraviolet sensor as a second direct ultraviolet value; in response to detecting alignment between orientation of the light exposure device and the second target diffuse orientation at approximately the second time, the light exposure device can record a fifth value read from the ultraviolet sensor as a second diffuse ultraviolet value; and, in response to detecting alignment between orientation of the light exposure device and a second target global orientation at approximately the second time, the light exposure device can record a sixth value read from the ultraviolet sensor as a second global ultraviolet value. From the second direct orientation, the second diffuse orientation, and the second global orientation, the light exposure device can calculate a second ultraviolet index at the light exposure device.

The light exposure device can continue to implement this second location for subsequent sampling intervals until an updated location is received from the mobile computing device.

5. Ultraviolet Index

Block S150 of the method S100 recites calculating a current ultraviolet index at the light exposure device based on the diffuse ultraviolet value, the direct ultraviolet value, and the global ultraviolet value. Generally, Block S150 of the method S100 functions to calculate an ultraviolet index for the current time and instant location of the light exposure device based on the global ultraviolet index or a combination (linear or non-linear) of the diffuse ultraviolet value, the direct ultraviolet value, and the global ultraviolet value.

In one implementation, the light exposure device can calculate a global ultraviolet index proportional to the global ultraviolet value by comparing the global ultraviolet value to a known mathematical model—such as a ultraviolet index curve defining a regression (e.g., a linear regression) of previously recorded global ultraviolet values and ultraviolet indices—that links global ultraviolet values to discrete ultraviolet indices.

In another implementation, the light exposure device can calculate a diffuse ultraviolet index proportional to the diffuse ultraviolet value by comparing the diffuse ultraviolet value to a known mathematical model (e.g., curve), defined as a regression (e.g., a linear regression) of previously recorded diffuse ultraviolet values, that links diffuse ultraviolet values to discrete ultraviolet indices. Similarly, the light exposure device can calculate a direct ultraviolet index proportional to the direct ultraviolet value by comparing the direct ultraviolet value to a direct mathematical model, defined as a regression of previously recorded direct ultraviolet values, that links direct ultraviolet values to discrete ultraviolet indices. Additionally, the light exposure device can calculate a global ultraviolet index proportional to the global ultraviolet value by comparing the global ultraviolet value to a global mathematical model, as described above, that links global ultraviolet values to discrete ultraviolet indices. The light exposure device can then calculate a combination (e.g., an average) of the direct and/or diffuse ultraviolet indices to calculate a current ultraviolet index for the current sampling interval.

Alternatively, the light exposure device can compare the global, direct, and diffuse ultraviolet values and/or ultraviolet indices to predict whether the user is occupying a shaded area and then selectively transform these ultraviolet values into a current ultraviolet index for the current sampling interval. For example, the light exposure device can calculate a diffuse ultraviolet index based on (e.g., as a function of, proportional to) the diffuse ultraviolet value and can calculate a direct ultraviolet index based on the direct ultraviolet value. In response to a difference between the global ultraviolet index and the direct ultraviolet index exceeding a threshold difference and in response to the global ultraviolet index remaining below the direct ultraviolet index, the light exposure device can: determine the light exposure device occupied a shaded area (e.g., under a tree) at the time that these ultraviolet values were recorded; and then determine the current ultraviolet index for the current sampling interval based on the direct and/or diffuse ultraviolet values and/or ultraviolet indices, such as by calculating an average or other combination of the diffuse ultraviolet index and the direct ultraviolet index, exclusive of the global ultraviolet index. Similarly, if the light exposure device calculates global and diffuse ultraviolet indices that approximately match but calculates a direct ultraviolet index that is significantly less than the global and diffuse ultraviolet indices from global, diffuse, and direct ultraviolet values recorded during a sampling interval, the light exposure device can determine that the light exposure device occupied an outdoor structure (e.g., a wall, a building) that shaded the light exposure device from direct sun exposure during the sampling interval and thus calculate a ultraviolet index and select a ultraviolet index curve for the sampling interval based on the global value or based on the global and diffuse ultraviolet values recorded during this sampling interval only.

Alternatively, the light exposure device can: compare the global, direct, and diffuse ultraviolet indices; identify and discard one of the three ultraviolet indices that represents a significant outlier from the remaining to ultraviolet indices; and then average or otherwise combine the remaining ultraviolet indices to calculate a current ultraviolet index for the current sampling interval.

However, the light exposure device can calculate a current ultraviolet index for the current sampling interval in any other way and based on any other one or combination of ultraviolet values opportunistically recorded by the light exposure device during the sampling interval.

6. Redundancy & Calibration

As described above, the light exposure device can implement Blocks of the method S100 to calculate an ultraviolet index. By combining multiple ultraviolet values recorded by the ultraviolet sensor, the light exposure device can accurately approximate and verify the ultraviolet index regardless of an orientation or location of the light exposure device. Thus, through redundant recording of ultraviolet values (i.e., the direct radiation value, the diffuse radiation value, and the global radiation value), the light exposure device can detect and compensate for discrepancies in ultraviolet values.

For example, the light exposure device can calculate the current ultraviolet index based on the direct ultraviolet value and calculate a second ultraviolet index based on the diffuse ultraviolet value. In response to detecting variation between the second ultraviolet index and the current ultraviolet index greater than a threshold difference, the light exposure device can update the current ultraviolet index based on the second ultraviolet index, thereby correcting the current ultraviolet index with the second ultraviolet index. Furthermore, the light exposure device can calculate a third ultraviolet index based on the global ultraviolet value. In response to detecting variation between the third ultraviolet index and the (updated) current ultraviolet index less than a second threshold difference, the light exposure device can therefore confirm the current ultraviolet index based on the third ultraviolet index. In this example, an ultraviolet index calculated from a first ultraviolet value (e.g., the diffuse ultraviolet value) can be corrected by and/or verified by additional ultraviolet indices calculated based on ultraviolet values recorded in different orientations (e.g., the direct and global ultraviolet values). Thus, in this implementation, the light exposure device can implement Blocks of the method S100 to calibrate sensors, such as orientation sensors, within the light exposure device to improve accuracy of the ultraviolet values recorded by the ultraviolet sensor.

Figure 3:
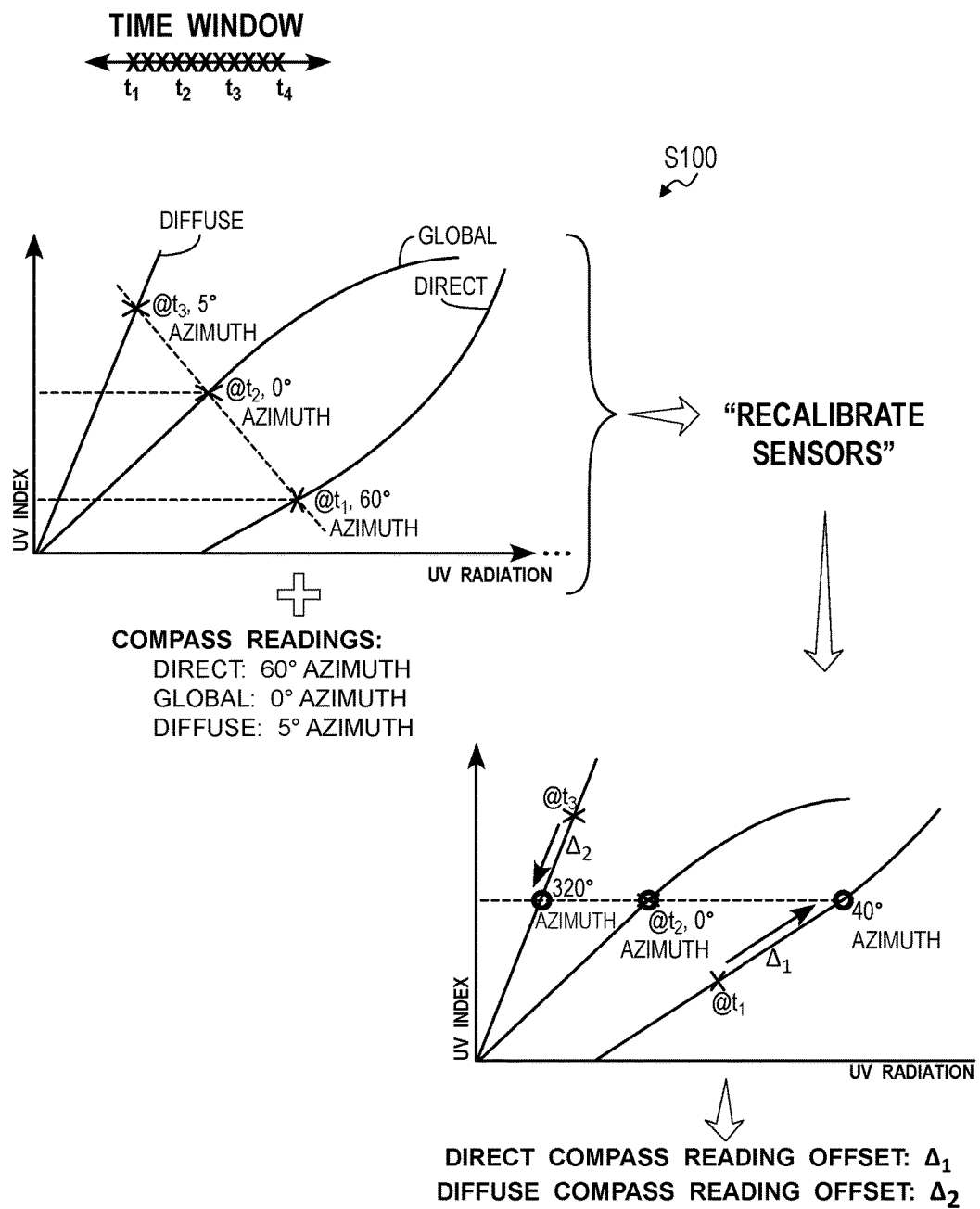
FIG. 3 is a flowchart representation of the first method.

In one implementation shown in FIG. 3, the light exposure device can implement Blocks of the method S100 to calibrate the compass sensor of the light exposure device. In this implementation, the compass sensor can track an azimuth orientation of the light exposure device and the light exposure device can define the target direct orientation and/or the target diffuse orientation based on the azimuth orientation. In response to detecting alignment between the light exposure device and the target direct orientation, the light exposure device can record a first direct ultraviolet value; in response to detecting alignment between the light exposure device and the target diffuse orientation, the light exposure device can record a first diffuse ultraviolet value; and, in response to detecting alignment between the light exposure device and the target global orientation, the light exposure device can record a first global ultraviolet value. In response to detecting variation among the first diffuse ultraviolet index, the first direct ultraviolet index, and the first global ultraviolet index exceeding the threshold ultraviolet index, the light exposure device can define an ultraviolet index curve as a combination of the first global ultraviolet index, the first diffuse ultraviolet index, and the first direct ultraviolet index and, similarly, define a compass calibration correction curve inversely proportional to the ultraviolet index curve. Thus, the light exposure device can define the compass calibration correction curve to adjust (i.e., offset) the first diffuse ultraviolet index, the first direct ultraviolet index, and the first global ultraviolet index, defined based on the azimuth orientation calculated by the compass sensor, such that variation among the (adjusted) first diffuse ultraviolet index, the (adjusted) first direct ultraviolet index, and the (adjusted) first global ultraviolet index is less than the threshold ultraviolet index. For future calculations of the diffuse ultraviolet index, the direct ultraviolet index, and the global ultraviolet index, the light exposure device can adjust (i.e., offset) the diffuse, direct, and global ultraviolet values to the compass calibration correction curve.

Furthermore, the light exposure device can, based on discrepancies among the diffuse, direct, and global ultraviolet values, correct calibration of the compass sensor (and/or other orientation sensors). In one implementation, in response to detecting variation among the diffuse, direct, and global ultraviolet indices exceeding the threshold ultraviolet index, the light exposure device can reject (e.g., delete or invalidate) the target direct orientation and the target diffuse orientation as inaccurate, while maintaining the target global orientation as a true value. From the target global orientation, the light exposure device can calculate an expected ultraviolet index to which the diffuse ultraviolet index and the direct ultraviolet index correspond when recorded at calibrated (i.e., corrected) target diffuse and target direct orientations. Then the light exposure device can calculate a second target direct orientation of the light exposure device based on the first location, the current time, the direct solar position model, the target global orientation, and expected ultraviolet value output by the light exposure device in the second target direct orientation corresponding to the expected ultraviolet index calculated by the light exposure device when aligned with the target global orientation. The light exposure device can also calculate a second target diffuse orientation of the light exposure device based on the first location, the current time, the diffuse solar position model, the target global orientation, and expected ultraviolet value output by the light exposure device in the second target diffuse orientation corresponding to the expected ultraviolet index calculated by the light exposure device when aligned with the target global orientation. In response to detecting alignment between orientation of the light exposure device and the second target direct orientation, the light exposure device can record a value read from the ultraviolet sensor as a second direct ultraviolet value; and, in response to detecting alignment between orientation of the light exposure device and the second target diffuse orientation, the light exposure device can record a value read from the ultraviolet sensor as a second diffuse ultraviolet value. Thus, as described above, the light exposure device can calculate a second current ultraviolet index at the light exposure device based on the second diffuse ultraviolet value, the second direct ultraviolet value, and the global ultraviolet value.

7. Ultraviolet Exposure

Figure 4A:
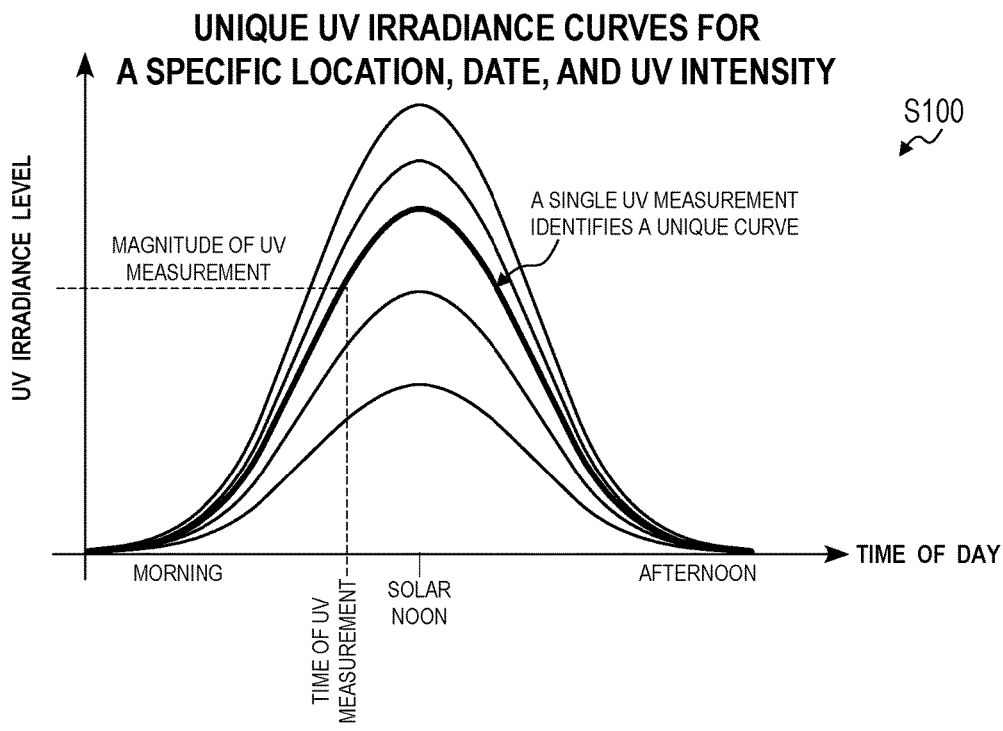
FIGS. 4A and 4B are schematic representations of the first method.
Figure 4B:
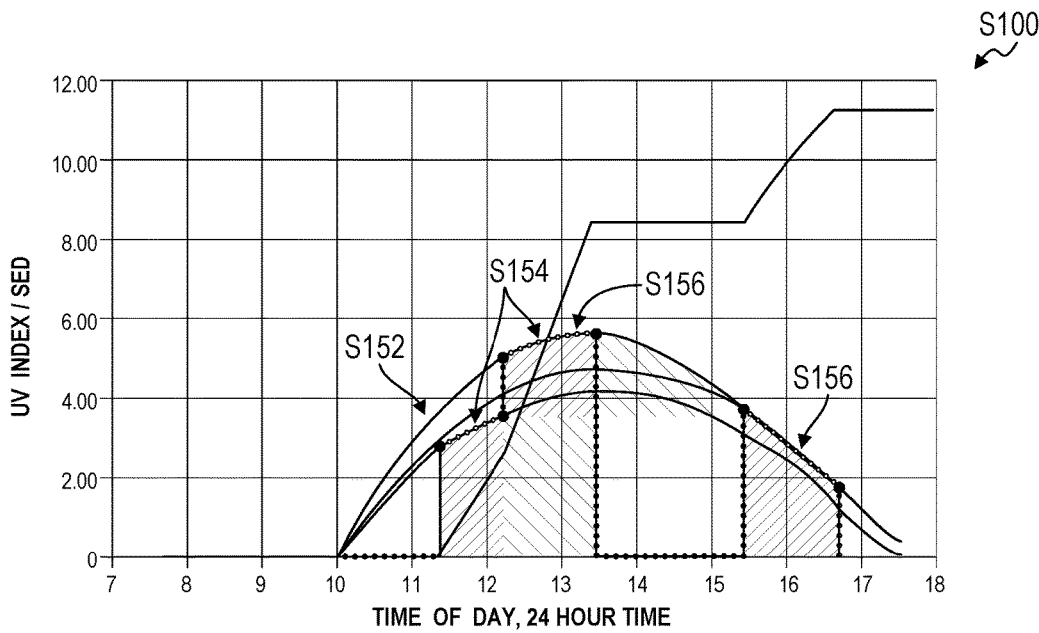

Furthermore, as shown in FIGS. 4A and 4B, Blocks S152-S156 of the method S100 recite accessing a set of ultraviolet index curves anticipating ultraviolet indices at discrete times within a first sampling interval succeeding the current time based on an ultraviolet index at approximately a first time in the first sampling interval in Block S152; at approximately the current time, selecting a first ultraviolet index curve from the set of ultraviolet index curves, the first ultraviolet index curve defining a first projected ultraviolet index at approximately the current time within a threshold offset from the current ultraviolet index at the current time and anticipating future ultraviolet indices for discrete times within the first sampling interval in Block S154; and during the first sampling interval, transitioning into a low-power mode (e.g., a "sleep mode") in Block S156. Generally, the light exposure device can implement Block S156 to calculate total ultraviolet exposure (i.e., exposure to ultraviolet radiation quantified by an ultraviolet index) of the user over multiple discrete sampling intervals, such as over the course of one day. Generally, an "ultraviolet index curve" can define non-parametric model, such as a lookup table. Alternatively, an "ultraviolet index curve" can include a parametric UV model.

In particular, the light exposure device can map recorded ultraviolet values to predefined ultraviolet exposure models (or "curves") to: interpolate between ultraviolet values when the ultraviolet sensor records ultraviolet values intermittently; and anticipate future ultraviolet indices succeeding a current time based on a last ultraviolet index recorded by the light exposure device (and/or predict past ultraviolet indices—and therefore past ultraviolet exposure levels—over periods of time before the light exposure device was actively collecting ultraviolet data). For example, the light exposure device can access a set of ultraviolet index curves in an ultraviolet exposure model. The light exposure device can then select a first ultraviolet index curve in the set of ultraviolet index curves in response to detecting alignment (or near alignment) between a current ultraviolet index, calculated by the light exposure device based on ultraviolet values recorded at a first time, and a projected ultraviolet index, defined by the first ultraviolet index curve at the first time. Based on the first ultraviolet index curve, the light exposure device can anticipate future ultraviolet indices over a time period succeeding the first time (e.g., an hour). At a second time shortly after the first time, the light exposure device can record a second ultraviolet value and calculate a second ultraviolet index. However, the first ultraviolet index curve can predict an ultraviolet index at the second time significantly lower than the second ultraviolet index calculated by the light exposure device. The light exposure device can implement Blocks of the method S100 to select a second ultraviolet index curve from the set of ultraviolet index curves in response to alignment (or near alignment) between an ultraviolet index predicted by the second ultraviolet index curve at the second time and the second ultraviolet index and alignment (or near alignment) between the ultraviolet index predicted by the first ultraviolet index curve at the first time and the first ultraviolet index. Thus, the method S100 can function to project future ultraviolet indices and, based on projections for future ultraviolet indices, interpolate between ultraviolet radiation samples to accurately forecast intermediate ultraviolet values, thereby avoiding demand for continuous sampling of the ultraviolet sensor.

The light exposure device can also align the ultraviolet index curves to (actual) ultraviolet indices calculated by the light exposure device from ultraviolet values recorded by the ultraviolet sensor.

7.1 Ultraviolet Index Curves

As shown in FIG. 4A, Block S152 of the method S100 functions to retrieve a (predefined) set of ultraviolet index curves, defining ultraviolet indices over a sampling interval based on an initial ultraviolet index. For a given time, each ultraviolet index curve in the set of ultraviolet index curves can define an expected ultraviolet index. For the given time, the expected ultraviolet index of a first ultraviolet index curve in the set of ultraviolet index curves can differ from the expected ultraviolet index of a second ultraviolet index curve in the set of ultraviolet index curves. Furthermore, each ultraviolet index curve in the set of ultraviolet index curves can predict a discrete set of ultraviolet indices over a sampling interval. For example, a first ultraviolet index curve can predict an ultraviolet index of one at a first time, an ultraviolet index of five at a second time, and an ultraviolet index of three at a third time. A second ultraviolet index curve can predict an ultraviolet index of 1.3 at the first time, an ultraviolet index of 4.7 at the second time, and an ultraviolet index of 3.4 at the third time.

In one implementation of the method S100, the light exposure device can select a first ultraviolet index curve from the set of ultraviolet index curves, the first ultraviolet index curve defining a first projected ultraviolet index at approximately the current time within a threshold offset from the current ultraviolet index at the current time and anticipating future ultraviolet indices for discrete times within the first sampling interval in Block S154.

Generally, the light exposure device can select a first ultraviolet index curve that approximates the current (calculated) ultraviolet index at the current time without a threshold margin of error. In this implementation, the light exposure device can, at a first time, access the set of ultraviolet index curves and select a first ultraviolet index curve from the set of ultraviolet index curves projecting an ultraviolet index at the first time nearest the current ultraviolet index calculated and recorded by the light exposure device. Thus, the first ultraviolet index curve can predict ultraviolet indices over a sampling interval succeeding the first time.

Alternatively, the device can select a first ultraviolet index curve that approximates the current (calculated) ultraviolet index at the current time without a threshold margin of error and then subsequently adjust the first ultraviolet index curve to fit (i.e., align with) the current calculated ultraviolet index at the first time. Generally, in this implementation, the method S100 can function to compensate for variations in total ozone (e.g., ozone levels, cloud cover, carbon dioxide levels, etc.) that affect magnitude of ultraviolet radiation recorded by the light exposure device.

7.2 Ultraviolet Exposure

Additionally, the light exposure device can apply the ultraviolet index curves to track total exposure over a sampling interval while avoiding continuous sampling of the ultraviolet sensor. Generally, the light exposure device can calculate an ultraviolet exposure over a sampling interval by integrating a (net) ultraviolet index exposure curve over the sampling interval.

In one implementation shown in FIG. 4B, the light exposure device can record ultraviolet values intermittently over a sampling interval and calculate ultraviolet indices corresponding to the (intermittently recorded) ultraviolet values over the sampling interval in response to triggers, as described above. Thus, as described above, the light exposure device can select a first ultraviolet index curve corresponding to (or approximating) a first ultraviolet index value calculated by the light exposure device at a first time. From the ultraviolet index curve, the light exposure device can predict ultraviolet indices at times succeeding the first time. However, at a second time succeeding the first time, the light exposure device can be triggered to record a second direct ultraviolet value, a second diffuse ultraviolet value, and a second global ultraviolet value. From the second direct, diffuse, and global ultraviolet values, the light exposure device can calculate a second ultraviolet index for the second time. However, the first ultraviolet index curve can predict a third ultraviolet index distinct from (e.g., less than or greater than) the second ultraviolet index at the second time. Thus, the light exposure device can select a second ultraviolet index curve predicting an ultraviolet index value at the second time corresponding to (or approximating) the second ultraviolet index at the second time. Furthermore, for times succeeding the second time within the sampling interval, the light exposure device can apply the second ultraviolet index curve instead of the first ultraviolet index curve to predict future ultraviolet indices over the sampling interval. Thus, to track cumulative ultraviolet exposure from the first time to a third time succeeding the second time, the light exposure device can define a cumulative ultraviolet index exposure curve by combining the first curve and the second curve—the second curve defining a step-wise jump in the ultraviolet index at the second time. By integrating the cumulative index exposure curve over the sampling interval between the first time and the third time, the light exposure device can calculate a cumulative ultraviolet exposure over the sampling interval.

However, the light exposure device can track and integrate ultraviolet exposure in any other way suitable to determine overall ultraviolet exposure.

7.3 Ultraviolet Index Curve Adjustment

Additionally or alternatively, the light exposure device can implement Blocks of the method S100 to adjust the ultraviolet index curves to align with ultraviolet indices calculated from ultraviolet values recorded by the light exposure device.

For example, as described above, the light exposure device can select an original ultraviolet index curve approximating a current ultraviolet index calculated by the light exposure device based on the direct, diffuse, and/or global ultraviolet values recorded by the ultraviolet sensor at a first time and anticipating future ultraviolet indices for a sampling interval succeeding the first time, assuming clear sky, outdoor ambient conditions surrounding the light exposure device (e.g., a total ozone factor of zero). However, the ultraviolet index curve can predict a projected ultraviolet index at the first time less than (or greater than) the current ultraviolet index. Thus, the light exposure device can adjust the ultraviolet index curve to align with the current ultraviolet index, thereby defining an alignment offset between the (original) projected ultraviolet index and the current ultraviolet index. Furthermore, the light exposure device can adjust the ultraviolet index curve to anticipate future ultraviolet indices, adjusting the (original) ultraviolet index curve in its entirety by the alignment offset. From the alignment offset, the light exposure device can determine a total ozone factor that accounts for discrepancies between the original ultraviolet index curve and an adjusted ultraviolet index curve and compensate for variations in ambient conditions, such as cloud cover, high ozone values, time in a shaded area, etc.

However, the light exposure device can compensate for deviation between recorded and predicted ultraviolet indices in any other way in order to yield accurate ultraviolet exposure metrics with intermittent ultraviolet radiation measurements.

8 Notifications

One variation of the method S100 includes, in response to detecting the total ultraviolet exposure exceeding a threshold exposure, transmitting a notification or alert to the mobile computing device indicating projection of excess ultraviolet exposure over the first sampling interval and the third sampling interval. Generally, this variation of the method S100 functions to notify a user carrying a light exposure device of excessive ultraviolet exposure, which may increase the user's risk for erythema, skin damage, heat stroke, etc.

For example, the light exposure device can calculate an aggregate ultraviolet exposure over a time period, such as four hours. In response to the aggregate ultraviolet exposure exceeding a predefined threshold, the light exposure device can predict when a user associated with the light exposure device will experience skin damage and publish a countdown timer to the mobile computing device to notify the user of a duration until such skin damage will occur. Furthermore, the light exposure device can issue intermittent alerts for the mobile computing device to render, such as on a display, to remind a user to reapply sunscreen, head indoors during a peak exposure sampling interval, put on a hat or visor, etc.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for measuring ambient ultraviolet light radiation comprising:
    accessing a first location of a light exposure device comprising an ultraviolet sensor;
    calculating a target direct orientation of the light exposure device based on the first location, a current time and date, and a direct solar position model, the ultraviolet sensor approximately normal the Sun when the light exposure device occupies the target direct orientation at approximately the current time;
    calculating a target diffuse orientation of the light exposure device based on the first location, the current time, and a diffuse solar position model, the ultraviolet sensor biased away from the Sun when the light exposure device occupies the target diffuse orientation at approximately the current time;
    tracking an orientation of the light exposure device;
    in response to detecting alignment between orientation of the light exposure device and the target direct orientation at approximately the current time, recording a direct ultraviolet value read from the ultraviolet sensor;
    in response to detecting alignment between orientation of the light exposure device and the target diffuse orientation at approximately the current time, recording a diffuse ultraviolet value read from the ultraviolet sensor;
    in response to detecting alignment between orientation of the light exposure device and a target global orientation at approximately the current time, recording a global ultraviolet value read from the ultraviolet sensor; and
    calculating a current ultraviolet index at the light exposure device based on the global ultraviolet value.

2. The method of claim 1:
    further comprising calculating the target global orientation of the light exposure device by:
        defining a first vector normal parallel to gravity and within a reference frame; and
        defining the target global orientation in the form of a first cone coaxial the first vector;
    where calculating the target direct orientation of the light exposure device comprises:
        identifying a solar zenith of the Sun relative the first location of the light exposure device at the current time and date;
        defining a second vector directed toward a center of the Sun within the reference frame according to the solar zenith; and
        defining the target direct orientation in the form of a second cone coaxial the second vector;
    wherein calculating the target diffuse orientation of the light exposure device comprises defining the target diffuse orientation relative to the reference frame and comprising a three-dimensional zone extending above the horizon, less a first sector below a threshold angle above the horizon and less a second sector comprising the solar zenith of the Sun at the current time and date.

3. The method of claim 1:
further comprising:
at an first time preceding the current time by a threshold duration of time, reading an first ambient light value from an ambient light sensor integrated into the light exposure device;
at approximately the first time, reading an first global ultraviolet value from the ultraviolet sensor in response to detecting alignment between orientation of the light exposure device and the target global orientation at approximately the first time;
in response to a threshold ambient light value exceeding the first ambient light value and in response to a threshold ultraviolet value exceeding the first global ultraviolet value:
identifying the ultraviolet sensor as obscured at the first time; and
discarding the first global ultraviolet value;
at approximately the current time, reading a current ambient light value from the ambient light sensor; and
at approximately the current time, identifying the ultraviolet sensor as exposed in response to detecting the current ambient light value exceeding the threshold ambient light value; and
wherein recording the global ultraviolet value read from the ultraviolet sensor comprises recording the global ultraviolet value read from the ultraviolet sensor at approximately the current time in response to identifying the ultraviolet sensor as exposed and detecting alignment between orientation of the light exposure device and a target global orientation at approximately the current time.

4. The method of claim 3:
wherein recording the direct ultraviolet value comprises:
in response to detecting the first ambient light value exceeding the first threshold ambient light value at approximately the first time and in response to detecting alignment between orientation of the light exposure device and the target direct orientation within a threshold window of the first time, recording a first value read from the ultraviolet sensor as the direct ultraviolet value;
wherein recording the diffuse ultraviolet value comprises:
in response to detecting the first ambient light value exceeding the first threshold ambient light value at approximately the first time and in response to detecting alignment between orientation of the light exposure device and the target direct orientation within the threshold window of the first time, recording a second value read from the ultraviolet sensor as the diffuse ultraviolet value; and
wherein recording the global ultraviolet value comprises:
in response to detecting the first ambient light value exceeding the first threshold ambient light value at approximately the first time and in response to detecting alignment between orientation of the light exposure device and the target global orientation within the threshold window of the first time, recording a third value read from the ultraviolet sensor as the global ultraviolet value.

5. The method of claim 3, further comprising, in response to the first ambient light value exceeding the first threshold ambient light value at approximately the first time and in response to the threshold ultraviolet value exceeding the first global ultraviolet value:
determining the light exposure device to occupy an indoor location at approximately the first time; and
estimating an ultraviolet exposure of null from approximately the first time to approximately the current time.

6. The method of claim 1, wherein calculating the current ultraviolet index comprises:
calculating a diffuse ultraviolet index as a function of the diffuse ultraviolet value;
calculating a direct ultraviolet index proportional to the direct ultraviolet value;
calculating a global ultraviolet index proportional to the global ultraviolet value; and
in response to detecting variation among the diffuse ultraviolet index, the direct ultraviolet index, and the global ultraviolet index less than a threshold ultraviolet index, defining the current ultraviolet index as a function of the diffuse ultraviolet index, the direct ultraviolet index, and the global ultraviolet index.

7. The method of claim 1, further comprising:
calculating a diffuse ultraviolet index as a function of the diffuse ultraviolet value;
calculating a direct ultraviolet index proportional to the direct ultraviolet value; and
in response to variation between the global ultraviolet index and the direct ultraviolet index exceeding a threshold difference and the global ultraviolet index remaining below the direct ultraviolet index:
determining that the light exposure device is occupying a shaded area; and
calculating the current ultraviolet index based on the diffuse ultraviolet index and the direct ultraviolet index.

8. The method of claim 1, further comprising:
accessing a set of ultraviolet index curves anticipating ultraviolet indices at discrete times within a first sampling interval containing the current time;
selecting a first ultraviolet index curve, from the set of ultraviolet index curves, defining a first projected ultraviolet index at approximately the current time of day, the first projected ultraviolet index approximating the current ultraviolet index;
integrating the first ultraviolet index exposure curve from the current time over a duration of the first sampling interval to calculate a first ultraviolet exposure for the first sampling interval; and
in response to recording the global ultraviolet value during the first sampling interval, transitioning into a low-power mode for a preset duration of time.

9. The method of claim 8, further comprising, at a second time succeeding the current time by less than a threshold period of time and within the first sampling interval:
in response to detecting alignment between orientation of the light exposure device and the target global orientation at approximately the second time, recording a second global ultraviolet value read from the ultraviolet sensor;
calculating a second ultraviolet index at the light exposure device based on the second global ultraviolet value;
generating a revised ultraviolet index curve for the first sampling interval by transforming the first ultraviolet index curve into alignment with the current ultraviolet index at the current time and the second ultraviolet index at the second time; and updating the first ultraviolet exposure by integrating the revised ultraviolet index curve over the first sampling interval.

10. The method of claim 8, further comprising:
in response to detecting alignment between orientation of the light exposure device and the target global orientation at a second time in a second sampling interval succeeding the first sampling interval, recording a second global ultraviolet value read from the ultraviolet sensor;
calculating a second ultraviolet index at the light exposure device based on the second global ultraviolet value;
at approximately the second time, selecting a second ultraviolet index curve, from the set of ultraviolet index curves, defining a second projected ultraviolet index at approximately the second time of day, the second projected ultraviolet index approximating the second ultraviolet index;
integrating the second ultraviolet index exposure curve from the second time over a duration of the second sampling interval to calculate a second ultraviolet exposure for the second sampling interval; and
aggregating the first ultraviolet exposure and the second ultraviolet exposure to calculate a total ultraviolet exposure of a user associated with light exposure device over the first sampling interval and the second sampling interval.

11. The method of claim 10, further comprising, at a third time prior to expiration of the second sampling interval, in response to the total ultraviolet exposure exceeding a threshold exposure, serving a notification to the user indicating excess Sun exposure.

12. The method of claim 8, further comprising:
calculating an inactive period over which the first ultraviolet index exposure curve is less than a threshold ultraviolet index based on the first location and based on the current time and date;
operating in the low-power mode during the inactive period; and
estimating an ultraviolet exposure of null over the inactive period.

13. The method of claim 1:
wherein accessing the first location of the light exposure device comprises, at a mobile computing device:
detecting the first location of the mobile computing device; and
transmitting a record of the first location to the light exposure device over a short-range wireless network;
further comprising:
at the mobile computing device, in response to detecting relocation of the mobile computing device from the first location to a second location offset from the first location by more than a threshold distance, transmitting a record of the second location to the light exposure device over the short-range wireless network:
at the light exposure device:
calculating a second target direct orientation of the light exposure device based on the second location, the second time, and the direct solar position model, the ultraviolet sensor approximately normal the Sun when the light exposure device occupies the second target direct orientation at approximately the second time;
calculating a second target diffuse orientation of the light exposure device based on the second location, the second time, and the diffuse solar position model, the ultraviolet sensor biased away from the Sun when the light exposure device occupies the second target diffuse orientation at approximately the second time;
in response to detecting alignment between orientation of the light exposure device and the second target direct orientation at approximately the second time, recording a second direct ultraviolet value read from the ultraviolet sensor;
in response to detecting alignment between orientation of the light exposure device and the second target diffuse orientation at approximately the second time, recording a second diffuse ultraviolet value read from the ultraviolet sensor;
in response to detecting alignment between orientation of the light exposure device and a second target global orientation at approximately the second time, recording a second global value read from the ultraviolet sensor; and
calculating a second ultraviolet index at the light exposure device based on the second global ultraviolet value.

14. The method of claim 1:
wherein calculating the target global orientation of the light exposure device comprises calculating a target global orientation window over which the ultraviolet sensor remains within a threshold range of vertical; and
further comprising, at a second time succeeding the current time within the first sampling interval:
recording a fourth value read from the ultraviolet sensor at a fourth orientation within the target global orientation window and offset from vertical by an offset range less than the threshold range;
in response to the fourth value exceeding the global ultraviolet value, recording the fourth value as the global ultraviolet value; and
reducing the target global orientation for the first sampling interval.

* * * * *